(12) United States Patent
Mullin et al.

(10) Patent No.: US 10,582,696 B1
(45) Date of Patent: Mar. 10, 2020

(54) MEDICINE DELIVERY SYSTEM FOR ANIMALS

(71) Applicant: Make Ideas, LLC, La Jolla, CA (US)

(72) Inventors: Keith Alan Mullin, La Jolla, CA (US); Loren Taylor, Chatham Township, NJ (US)

(73) Assignee: Make Ideas, LLC, La Jolla, CA (US)

( * ) Notice: Subject to any disclaimer, the term of this patent is extended or adjusted under 35 U.S.C. 154(b) by 704 days.

(21) Appl. No.: 14/694,951

(22) Filed: Apr. 23, 2015

Related U.S. Application Data

(60) Provisional application No. 61/983,433, filed on Apr. 23, 2014.

(51) Int. Cl.
*A01K 15/02* (2006.01)
*A61D 7/00* (2006.01)
*B02C 2/02* (2006.01)

(52) U.S. Cl.
CPC .............. *A01K 15/025* (2013.01); *A61D 7/00* (2013.01); *B02C 2/02* (2013.01)

(58) Field of Classification Search
CPC .............. A01K 15/025; A01K 15/0114; A01K 15/026; B02C 2/02; B02C 19/08
See application file for complete search history.

(56) References Cited

U.S. PATENT DOCUMENTS

| | | |
|---|---|---|
| 1,006,182 A | 10/1911 | Cousin |
| 1,022,112 A | 4/1912 | Smith |
| 1,031,095 A | 7/1912 | Smith |
| 1,534,964 A | 4/1925 | Kahnweiler |
| 2,086,631 A | 7/1937 | Munro |
| 3,372,846 A | 3/1968 | Berkus |
| 4,124,135 A | 11/1978 | Weder et al. |
| 4,366,930 A * | 1/1983 | Trombetti, Jr. ....... A61J 7/0007 241/169 |
| 4,907,537 A | 3/1990 | Shirk |
| 5,232,130 A | 8/1993 | Woodard |
| 5,553,570 A | 9/1996 | VanNatter, III et al. |
| 5,595,142 A | 1/1997 | Chill |
| D393,421 S | 4/1998 | Kovens |
| 5,792,470 A | 8/1998 | Baumgardner, Sr. |
| 5,819,690 A | 10/1998 | Brown |
| 5,853,757 A | 12/1998 | Durand et al. |
| 5,865,146 A | 2/1999 | Markham |
| 5,895,662 A | 4/1999 | Meyer |
| 5,965,182 A | 10/1999 | Lindgren |
| 5,988,424 A | 11/1999 | Kovens |
| 6,099,872 A | 8/2000 | Whetstone |
| 6,143,316 A | 11/2000 | Hayden et al. |
| 6,148,771 A | 11/2000 | Costello |
| 6,217,408 B1 | 4/2001 | Willinger |
| 6,237,538 B1 | 5/2001 | Tsengas |

(Continued)

FOREIGN PATENT DOCUMENTS

GB          2253329 A          9/1992

*Primary Examiner* — Jessica B Wong
(74) *Attorney, Agent, or Firm* — Tillman Wright, PLLC; James D. Wright; David R. Higgins

(57) ABSTRACT

A pet toy for dispensing medicine, including an outer shell, an actuator assembly coupled to the outer shell, and an ingestible material initially disposed within the outer shell. Manipulation, by a pet, of the actuator assembly relative to the outer shell causes the ingestible material to exit the outer shell for ingestion by the pet.

19 Claims, 40 Drawing Sheets

(56) References Cited

U.S. PATENT DOCUMENTS

| | | |
|---|---|---|
| 6,405,681 B1 | 6/2002 | Ward |
| 6,415,741 B2 | 7/2002 | Suchowski et al. |
| 6,427,634 B1 | 8/2002 | Mann |
| 6,484,671 B2 | 11/2002 | Herrenbruck |
| 6,526,912 B1 | 3/2003 | Ottoson |
| 6,609,944 B1 | 8/2003 | Viola |
| 6,634,318 B1 | 10/2003 | Rucker |
| 6,990,762 B1 | 1/2006 | Muday et al. |
| 7,600,488 B2 | 10/2009 | Mann |
| 7,694,676 B2 | 4/2010 | Wachtel |
| 7,992,737 B2 | 8/2011 | Salice |
| 8,225,747 B2 | 7/2012 | Markham et al. |
| 8,501,218 B2 | 8/2013 | Hurwitz |
| 8,640,647 B2 | 2/2014 | Dotterer |
| 9,107,390 B1 * | 8/2015 | Day .................. A01K 15/025 |
| 2002/0139708 A1 | 10/2002 | Lien |
| 2003/0079693 A1 | 5/2003 | Jager |
| 2005/0092641 A1 | 5/2005 | Marsden et al. |
| 2011/0256208 A1 | 10/2011 | Ling |
| 2012/0321706 A1 | 12/2012 | Masri et al. |
| 2015/0068460 A1 * | 3/2015 | Jones .................. A01K 5/0114 119/51.01 |

\* cited by examiner

MEDICINE DELIVERY SYSTEM FOR ANIMALS

CROSS-REFERENCE TO RELATED APPLICATION

The present application is a U.S. nonprovisional patent application of, and claims priority under 35 U.S.C. § 119(e) to, U.S. provisional patent application Ser. No. 61/983,433, filed Apr. 23, 2014, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The invention relates generally to medicine delivery systems for animals, and, in particular, to pet toys for dispensing medicine and other ingestibles to animals when manipulated appropriately by the animals.

Background

A problem encountered by nearly all pet owners and many other animal caretakers is the administration of oral medications, food supplements, and other ingestible materials to an animal. Animals frequently object to the taste, smell, texture, or the like of the material, or are generally distrustful of the person administrating the material or the manner in which it is administered. Animals are also administered medicine or treats in a "give and serve" method where there is no "work" or "play" involved by the animal to receive their medicine or treat.

A variety of products have been developed to provide play pattern consumption of pet treats. Treat dispensing wobblers, such as the KONG® Wobbler, or other shapes are used to spill out treats when a dog bats and plays with the item. As the dog plays with the item, treats randomly fall out of the shape for consumption by the dog.

In other products, treats are attached to a structure, such as with the Busy Buddy® product line, available from Petmate®, or Outward Hound's Treatamals®, where the dog consumes treats that are mounted on a toy. The dog is entertained by working with and playing with a toy that has a treat component attached to the dog toy.

However, needs exist for improved products in this area, particularly for the administration of medicines, supplements, and the like.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect is a pet toy for dispensing medicine, including: an outer shell; an actuator assembly coupled to the outer shell; and an ingestible material initially disposed within the outer shell; wherein manipulation, by a pet, of the actuator assembly relative to the outer shell causes the ingestible material to exit the outer shell for ingestion by the pet.

In a feature of this aspect, the pet medicine dispenser further includes a mortar and pestle, wherein the ingestible material is initially disposed in the mortar, wherein either the mortar or the pestle is supported by the actuator assembly, and wherein the manipulation of the actuator assembly causes the pestle to enter the mortar, thereby displacing the ingestible material from the mortar such that it exits the outer shell for ingestion by the pet. In further features, the pestle includes a plurality of protuberances; and/or the pestle includes a plurality of surface features for assistance in breaking apart ingestible material in the form of a paste or semi-solid and to which the ingestible material temporarily adheres to when the pestle enters the mortar.

In another feature of this aspect, the outer shell includes a plurality of windows, and wherein the ingestible material exits the outer shell through the windows when the actuator assembly is manipulated by the pet. In a further feature, each of the windows is large enough to permit the ingestible material to be loaded therein.

In another feature of this aspect, the actuator assembly includes an actuator and a resilient skirt, baffle or other structure connecting the actuator to the outer shell. In a further feature, the actuator is a button-type actuator.

In another feature of this aspect, the outer shell includes an upper half and a lower half, and wherein the upper half and lower half are separable so as to permit the ingestible material to be loaded therein.

In another feature of this aspect, the actuator assembly and outer shell include fittings that mate with one another to permit the actuator assembly to be removed from the outer shell. In a further feature, the fittings are threaded fittings.

In another feature of this aspect, the pet medicine dispenser further includes a cavity contained within the outer shell, wherein the ingestible material is initially disposed within the outer shell. In further features, at least one dosage line is disposed in the cavity; the dosage line is disposed so as to correspond to a precise dosage measurement, and is marked with the dosage measurement; and/or a plurality of dosage lines, of different precise dosage measurements, are disposed in the cavity.

Broadly defined, the present invention according to another aspect is a pet toy for dispensing medicine, including: a flexible outer shell; a resilient interior skeleton structure providing support for the flexible outer shell; an ingestible material initially disposed within the outer shell; and an outlet through which the ingestible material exits the outer shell; wherein manipulation, by a pet, of the outer shell causes the ingestible material to exit the outer shell, via the outlet, for ingestion by the pet.

In a feature of this aspect, the outlet includes a plurality of microholes.

In another feature of this aspect, the resilient interior skeleton is not as flexible as the outer shell.

In another feature of this aspect, the interior skeleton structure includes a plurality of ribs.

In another feature of this aspect, the flexible outer shell is made of a thermoplastic elastomer.

In another feature of this aspect, the flexible outer shell has a hardness of between 0.40 and 0.75 durometers.

In another feature of this aspect, the interior skeleton structure has a hardness of between 0.80 and 0.95 durometers.

Broadly defined, the present invention according to another aspect is a pet toy for dispensing medicine, including: an outer shell penetrated by a plurality of microholes; and an ingestible material initially disposed within the outer shell; wherein manipulation, by a pet, of the outer shell causes the ingestible material to exit the outer shell, via the microholes, for ingestion by the pet.

Broadly defined, the present invention according to another aspect is a pet toy for dispensing medicine, including: an outer shell; a seep pad disposed in the outer shell; and an ingestible material initially disposed within the outer shell; wherein manipulation, by a pet, of the outer shell causes the ingestible material to exit the outer shell, via the seep pad, for ingestion by the pet.

Broadly defined, the present invention according to another aspect is a pet toy for dispensing medicine, including: an outer shell, including an upper half and a lower half resiliently coupled together such that when they are pushed closer together they are biased to spring back apart; and an interior cavity in which an ingestible material is initially disposed; wherein manipulation, by a pet, of the upper half relative to the lower half causes the ingestible material to exit the interior cavity and the outer shell for ingestion by the pet.

Broadly defined, the present invention according to another aspect is a pet toy for dispensing medicine, including: a flexible inner bladder; a resilient outer shell providing support for the flexible inner bladder; an ingestible material initially disposed within the inner bladder; and a first outlet via which the ingestible material exits the inner bladder; and a second outlet via which the ingestible material exists the outer shell; wherein manipulation, by a pet, of the outer shell and inner bladder causes the ingestible material to exit the inner shell via the first outlet, and subsequently exit the outer shell, via the second outlet, for ingestion by the pet.

In a feature of this aspect, the first outlet includes a plurality of microholes.

In another feature of this aspect, the second outlet includes a plurality of windows.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1A:
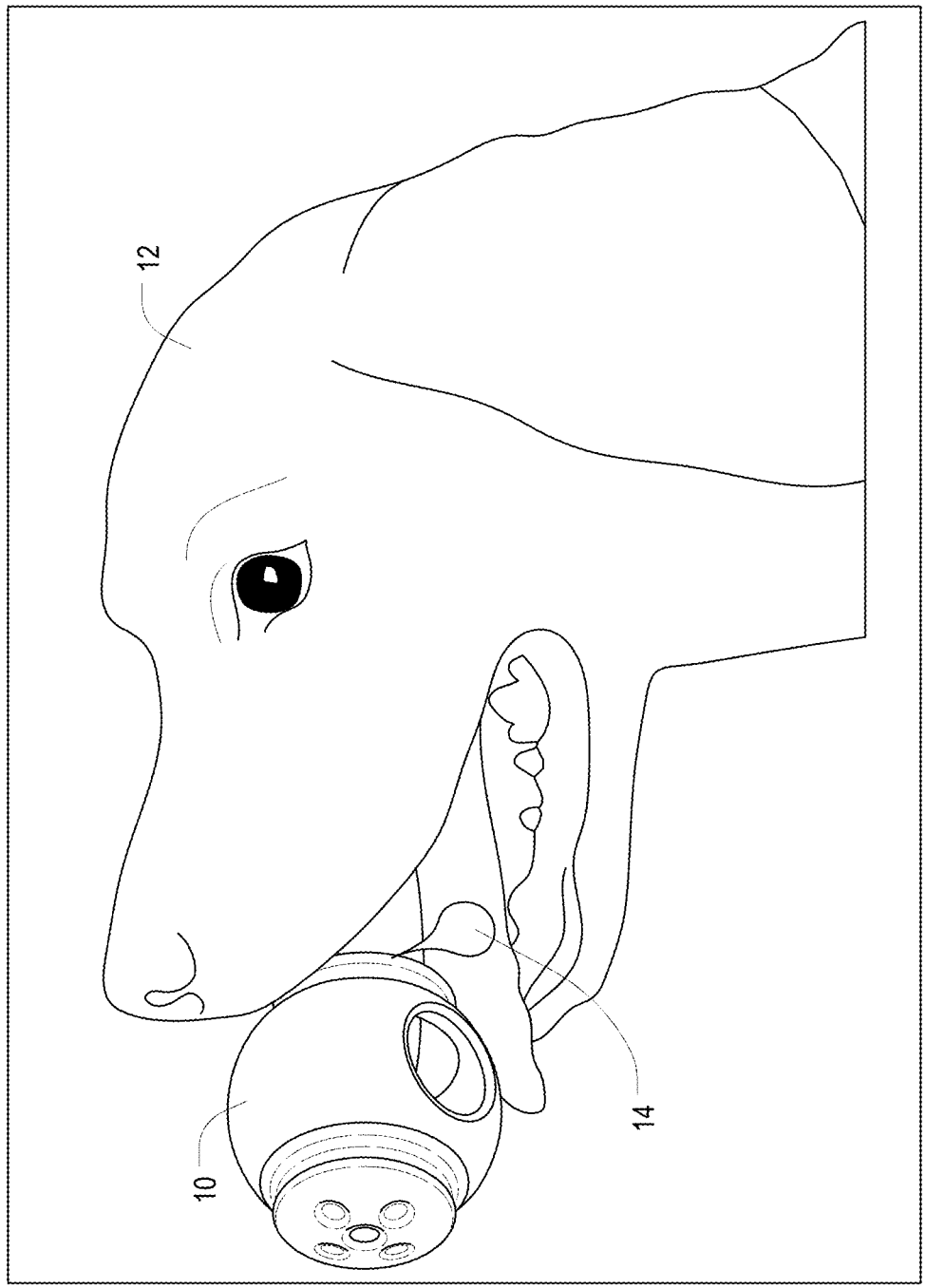
FIG. 1A is a perspective view of a pet dog using a "dipper ball" pet toy for dispensing medicine in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

In accordance with one or more preferred embodiments of the present invention, various pet toys for dispensing medicine are described and/or illustrated herein. In general, such pet medicine dispensers are in the form of a ball or other shape and size suitable for animal actuated delivery of medicine, dietary supplements, or the like (generally referred to hereinafter as "medicine") to a dog or other animal (generically referred to hereinafter as a "pet"). In various embodiments, the medicine may be in a liquid, paste, and/or semi-solid form, and the dispensers are designed to allow the medicine to spill, leak, seep, leach, excrete, or otherwise escape therefrom, particularly in response to being chewed, compressed, rolled, or otherwise actuated by the pet. For example, FIG. 1A is a perspective view of a pet dog 12 using a "dipper ball" pet toy 10 for dispensing medicine 14 in accordance with a first preferred embodiment of the present invention. As shown therein, the dog chews or otherwise applies pressure to the pet medicine dispenser 10 causing medicine 14 to spill, leak, seep, or otherwise escape therefrom for consumption by the pet 12. Structural and operational details about this pet medicine dispenser 10 and various other embodiments thereof are further described below.

Figure 1B:
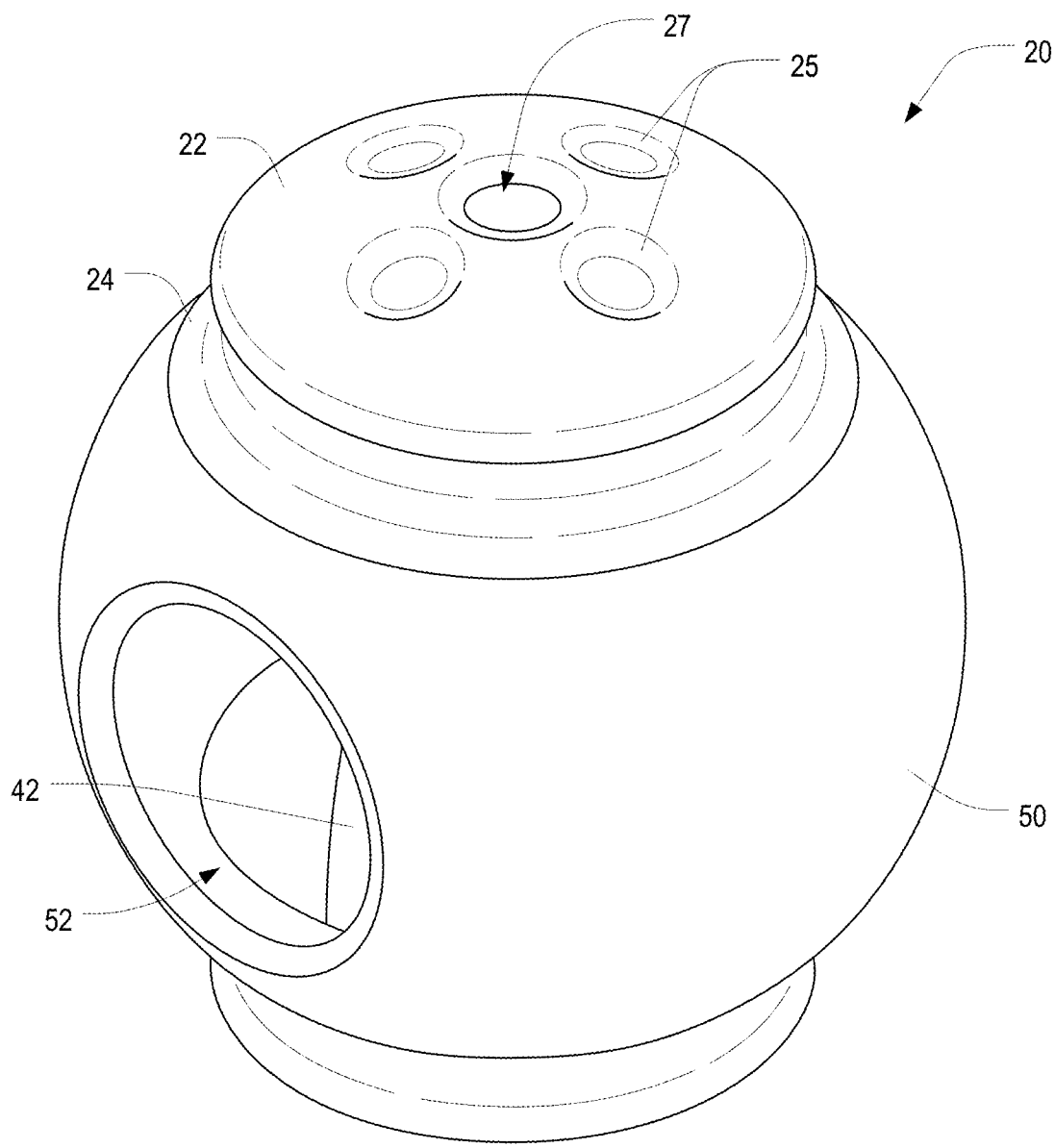
FIG. 1B is an isometric view of the pet medicine dispenser of FIG. 1A.
Figure 1C:
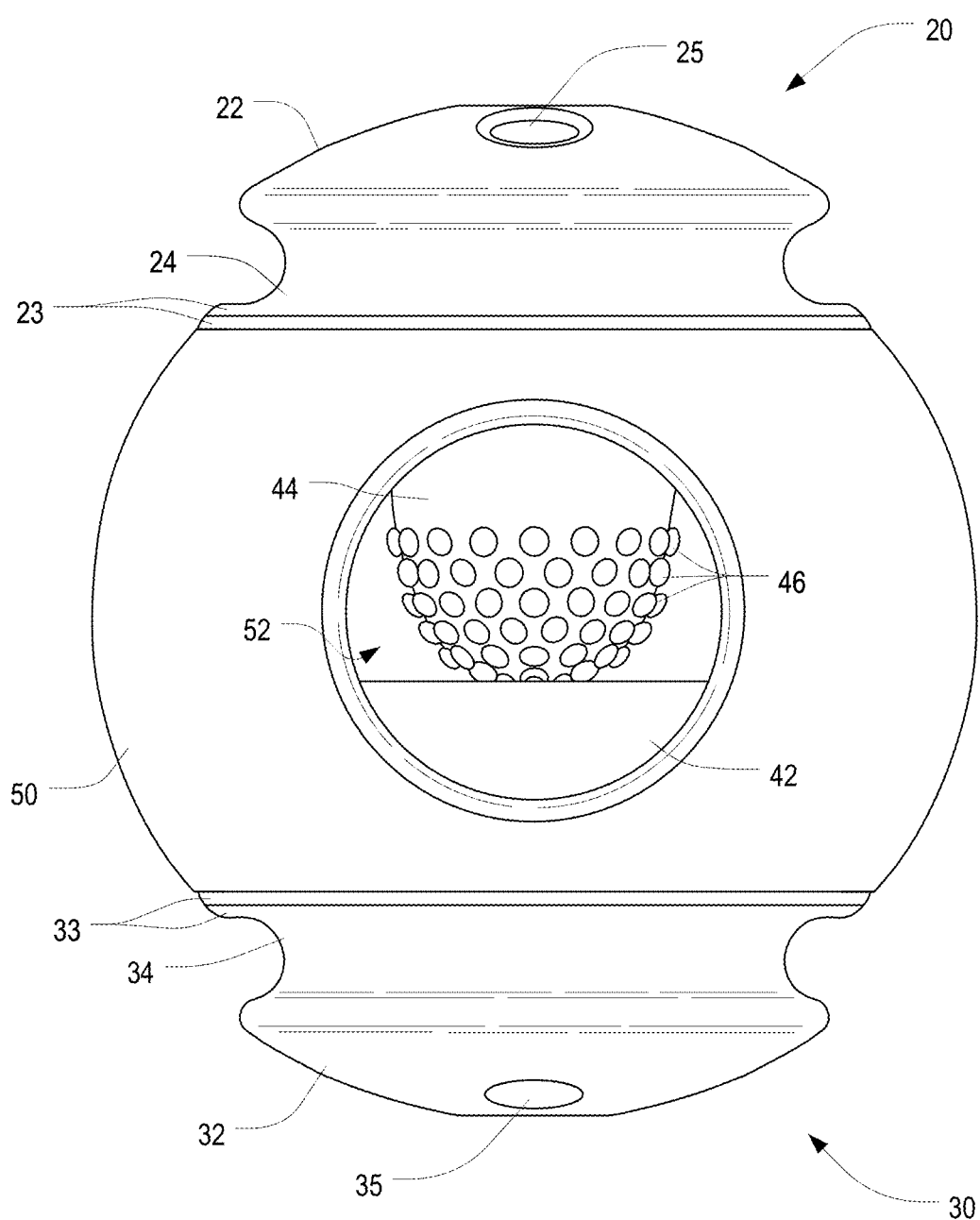
FIG. 1C is a side view of the pet medicine dispenser of FIG. 1A.
Figure 1D:
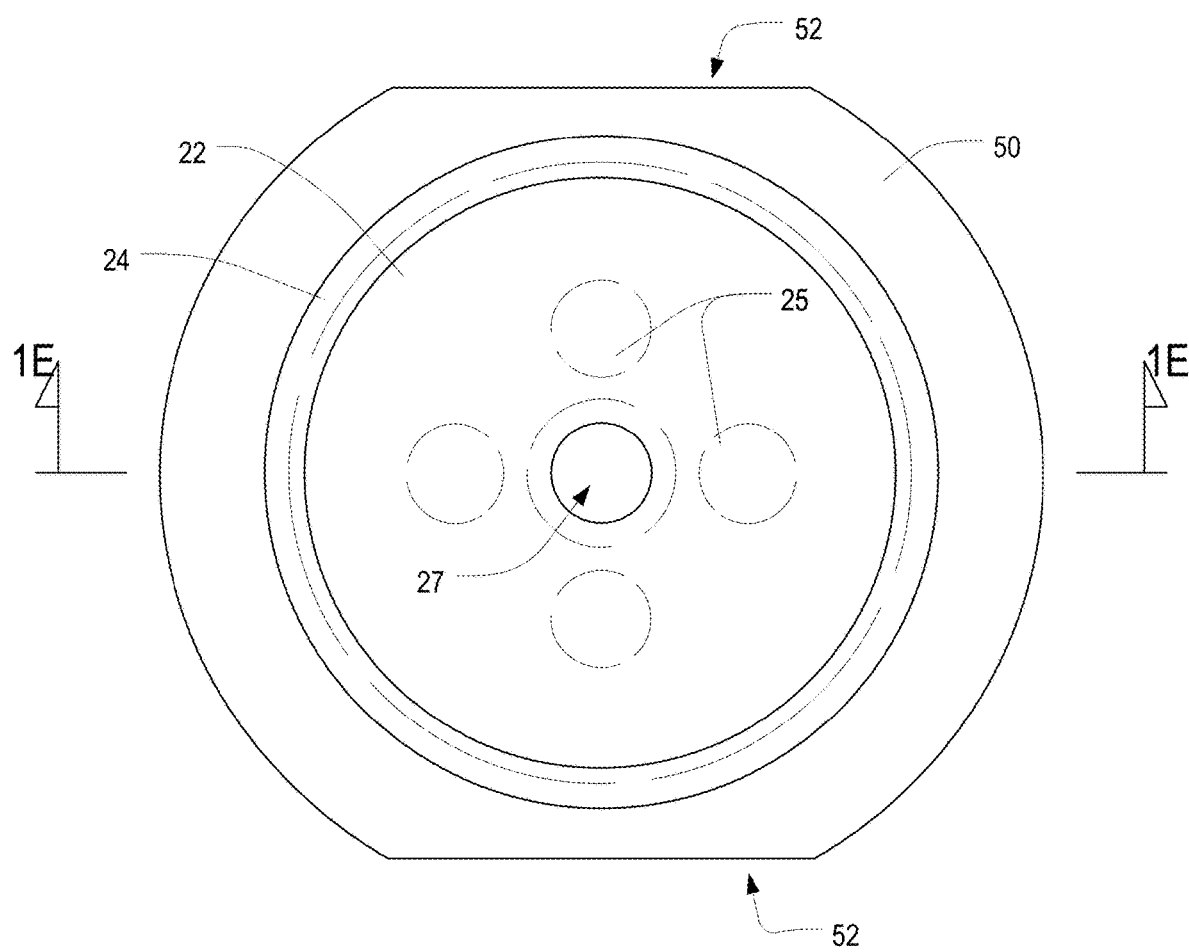
FIG. 1D is a top view, respectively, of the pet medicine dispenser of FIG. 1A.
Figure 1E:
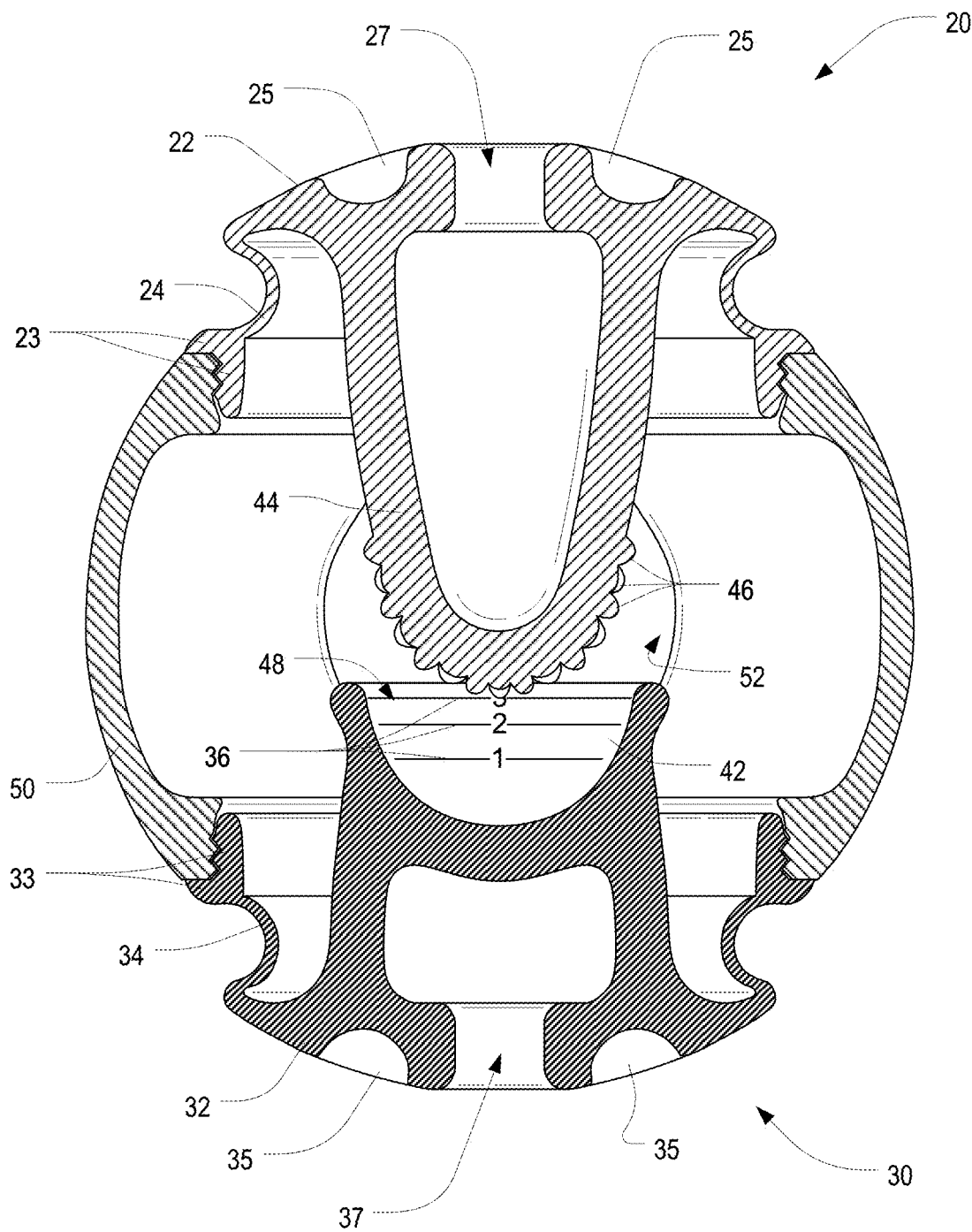
FIG. 1E is a front cross-sectional view of the pet medicine dispenser of FIG. 1D, taken along line 1E-1E.

FIGS. 1B, 1C, and 1D are an isometric view, a side view, and a top view, respectively, of the pet medicine dispenser 10 of FIG. 1A, while FIG. 1E is a front cross-sectional view of the pet medicine dispenser of FIG. 1D, taken along line 1E-1E. As shown therein, the pet medicine dispenser 10 includes a hollow ball structure 50, including a plurality of windows 52, and a pair of actuator assemblies 20,30. Each actuator assembly 20,30 includes a solid pad actuator 22,32, an attachment fitting 23,33, and a resilient skirt, baffle, or other structure 24,34 connecting the actuator 22,32 to the respective attachment fitting 23,33. As shown, the attachment fittings 23,33 include exterior thread structures that couple to corresponding interior thread structures on the hollow ball structure 50, but friction fittings, snap fittings, or the like may be used. The actuator assemblies 20,30 may be made of a single material or may include two different materials molded or otherwise formed or attached together. For example, one material may be utilized for the attachment fittings 23,33 and another for the resilient skirts 24,34. Some or all of the actuator assemblies 20,30 may be made of rubber having a hardness, for example, of 0.85 durometers. In at least some embodiments, the hollow ball structure 50 and/or one or both actuator assemblies 20,30 may be partially or completely made of transparent or translucent material.

As perhaps best shown in FIG. 1E, the upper actuator assembly 20 also includes a pestle 44 descending from the pad actuator 22, and the lower actuator 30 includes a corresponding mortar 42, defining an interior well or other cavity 48, disposed on its pad actuator 32. The mortar 42 and pestle 44 are aligned with each other and are sized such that the pestle 44 may fit into the well 48 of the mortar 42 when moved together as described below. Exterior surfaces of the lower end of the pestle 44 are preferably covered by protuberances 46 or other surface features for at least a purpose described below.

Figure 1F:
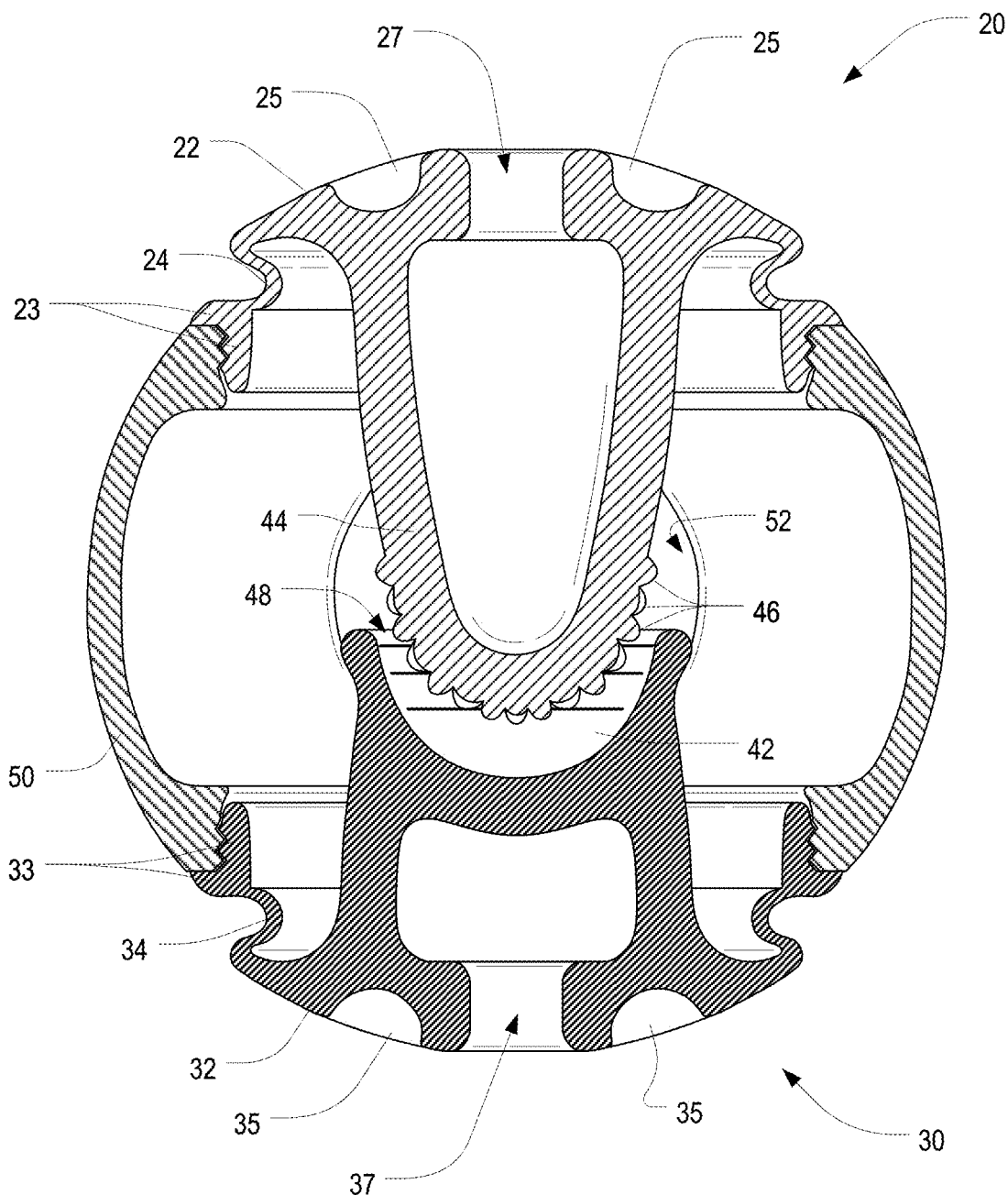
FIG. 1F is a front cross-sectional view of the pet medicine dispenser of FIG. 1E, shown in an actuated state.

FIG. 1F is a front cross-sectional view of the pet medicine dispenser 10 of FIG. 1E, shown in an actuated state. When sufficient force is applied, the resilient skirts 24,34 allow the pad actuators 22,32 to be depressed relative to hollow ball structure 50, thereby pushing the end of the pestle 44 into the well 48 of the mortar 42. In at least some embodiments, the various structures and elements of the pet medicine dispenser 10 are designed and arranged such that the end of the pestle 44, when the pad actuators 22,32 are fully depressed, is pushed all the way into the well 48 of the mortar 42, but this is not necessarily required. Because the skirts 24,34 are resilient, the pad actuators 22,32 preferably return to the state shown in FIG. 1E when the applied force is removed. The skirts, baffles, or other structures 24,34 are preferably designed such that the amount of force required to overcome their outward bias is within a range corresponding to the activities of the pet 12 with which the dispenser 10 is intended to be used. Such activities preferably incur biting, chewing, and/or tonguing the dispenser 10 and/or using paws to hold and/or squeeze the dispenser 10. Various surface features, for example including depressions 25,35 and cavities 27,37, may be provided on the pad actuators 22,32 to provide additional texture and grip for the pet 12, the user, or both.

Figure 1G:
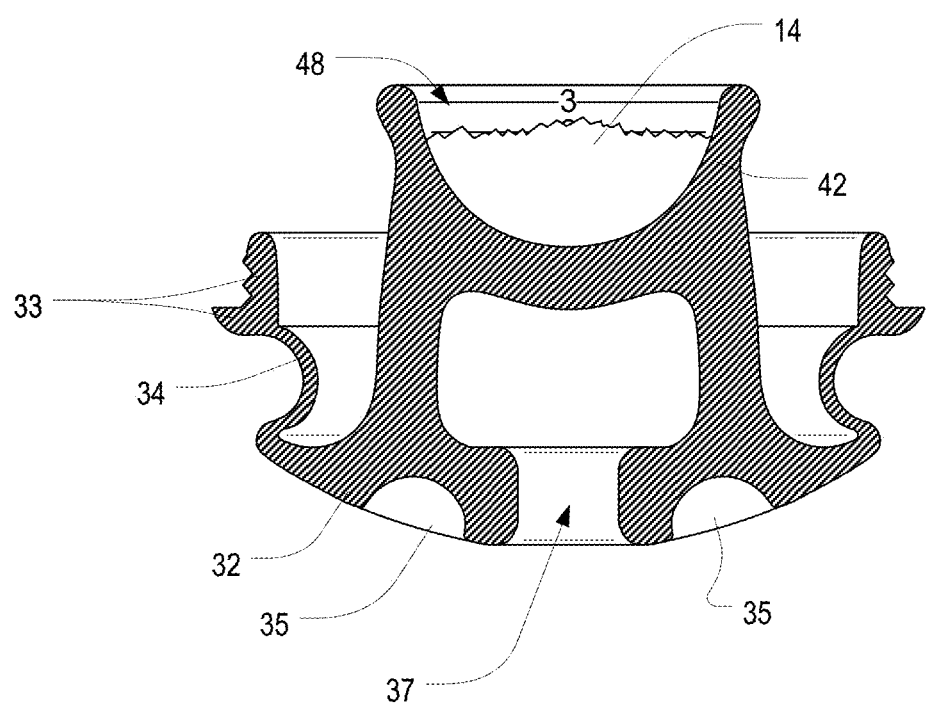
FIG. 1G is a cross-sectional view of the lower actuator assembly of FIG. 1E, shown separated from the rest of the dispenser.

With the lower actuator assembly 30 separated from the hollow ball structure 50, the interior well 48 of the mortar 42 may be filled with medicine 14 to a desired capacity. In this regard, FIG. 1G is a cross-sectional view of the lower actuator assembly 30 of FIG. 1E, shown separated from the rest of the dispenser 10. (Preferably, the upper actuator assembly 20 may also be separated from the hollow ball structure 50 to aid in cleaning and the like.) Fill lines 36 may be provided to aid in measuring out a desired dosage of the medicine 14. For example, a first fill line 36 may denote a quantity of one tablespoon, milliliter, or the like, a second fill line 36 may denote a quantity of two tablespoons, milliliters, or the like, and a third fill line 36 may denote a quantity of three tablespoons, milliliters, or the like. The lower actuator assembly 30 is then recoupled to the bottom of the hollow ball structure 50. Subsequently, the medicine 14 may begin to spill out of the mortar 42 and out through the windows 52. Particularly when the medicine 14 is in paste or semi-solid form, this process is particularly facilitated when one or both actuator assemblies 20,30 are depressed, thereby pushing the end of the pestle 44 into the medicine 14 contained in the mortar 42. Such action tends to cause the medicine 14 to spill out of the sides of the mortar 42 and out the windows 52. Additional dispersal of the medicine 14 occurs as the medicine 14 begins to stick to the protuberances 46 or other surface features. As the pet medicine dispenser 10 is manipulated, the medicine 14 is broken apart and alternately sticks to the protuberances 46 and falls off and out through the windows 52. In at least some instances, the pet 12 may further assist in the process using its tongue by extending its tongue through the windows 52 to reach the mortar 42, pestle 44, and the medicine 14 itself. In short, when the well 48 of the mortar 42 is filled with medicine 14, and the dispenser 10 is then provided to a pet 12, the pet begins using its mouth to play with the toy 10, the medicine 14 tends to spill out of the mortar 42 through a variety of means and subsequently disperses out through the ball shell windows 52 and into the pet's mouth.

Figure 2A:
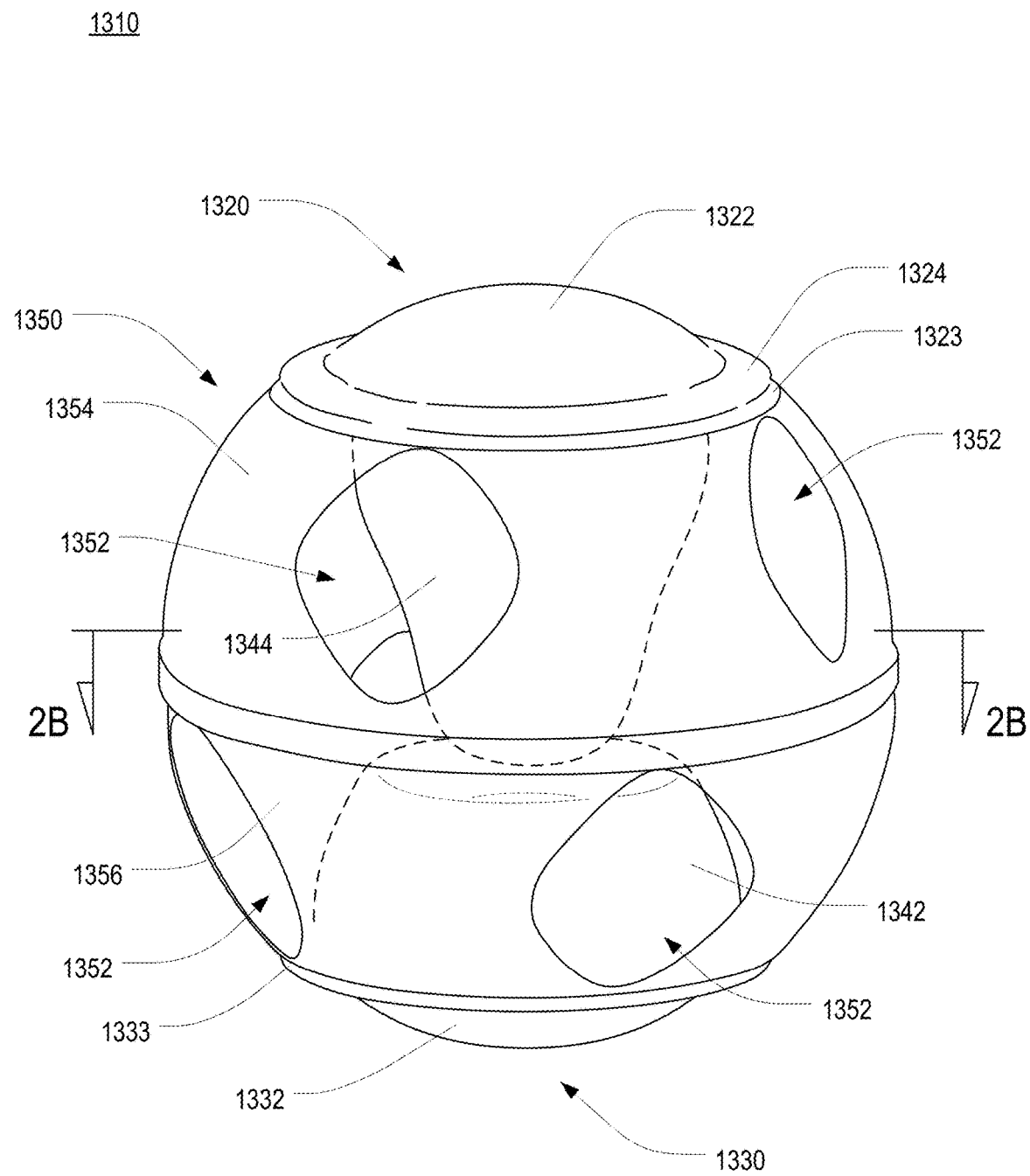
FIG. 2A is a perspective view of another "dipper ball" pet toy for dispensing medicine in accordance with one or more preferred embodiments of the present invention.
Figure 2B:
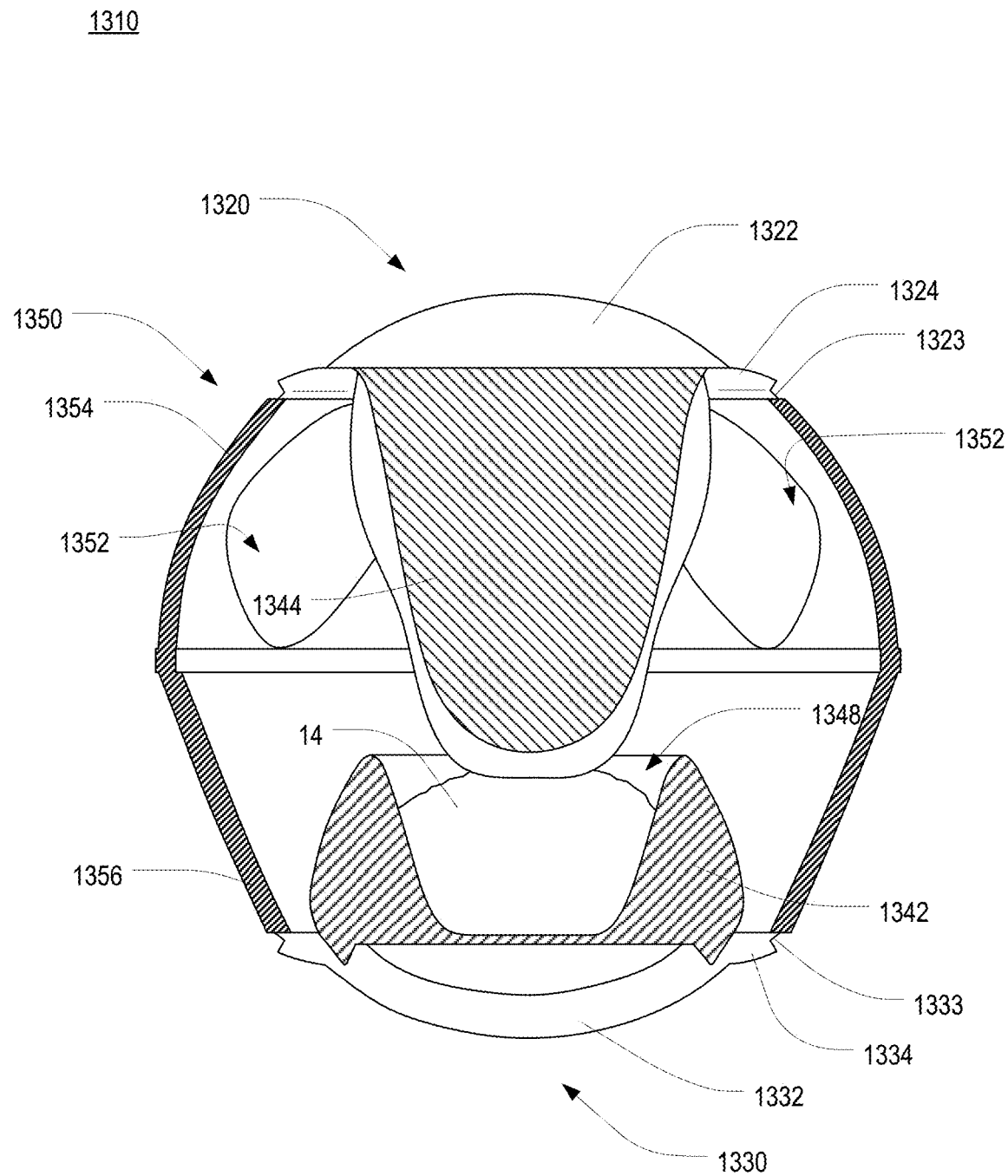
FIG. 2B is a front cross-sectional view of the pet medicine dispenser of FIG. 2A taken along line 2B-2B.

FIG. 2A is a perspective view of another "dipper ball" pet toy 1310 for dispensing medicine in accordance with one or more preferred embodiments of the present invention, while FIG. 2B is a front cross-sectional view of the pet medicine dispenser 1310 of FIG. 2A. As shown therein, the pet medicine dispenser 1310, portions of which are shown partially transparent for illustrative purposes, includes a hollow ball structure 1350, including a plurality of windows 1352, and a pair of actuator assemblies 1320,1330. The hollow ball structure 1350 includes two separate shell halves 1354,1356 that are coupled together by fittings of any of a variety of types, including threaded fittings, friction fittings, snap fittings, or the like. Each actuator assembly 1320,1330 includes a solid pad actuator 1322,1332, an attachment fitting 1323, 1333, and a resilient skirt, baffle, or other structure 1324, 1334 connecting the actuator 1322,1332 to the respective attachment fitting 1323,1333. In some embodiments, the attachment fittings 1323,1333 are permanent in that the actuator assemblies 1320,1330 cannot be removed, while in others the attachment fittings 1323,1333 permit the actuator assemblies 1320,1330 to be removed from shell halves 1354,1356. Removable fittings may include threaded fittings, friction fittings, snap fittings, or the like. The actuator assemblies 1320,1330 may be made of rubber having a hardness, for example, of 0.85 durometers. In at least some embodiments, the hollow ball structure 1350 and/or one or both actuator assemblies 1320, 1330 may be partially or completely made of transparent or translucent material.

The upper actuator assembly 1320 also includes a pestle 1344 descending from the pad actuator 1322, and the lower actuator 1330 includes a corresponding mortar 1342, defining an interior well or other cavity 1348, disposed on its pad actuator 1332. The mortar 1342 and pestle 1344 are aligned with each other and are sized such that the pestle 1344 may fit into the well 1348 of the mortar 1342 when moved together as described below. Exterior surfaces of the lower end of the pestle 1344 may be covered by protuberances, like those shown in FIGS. 1A-1G, or other surface features for at least a similar purpose.

Figure 2C:
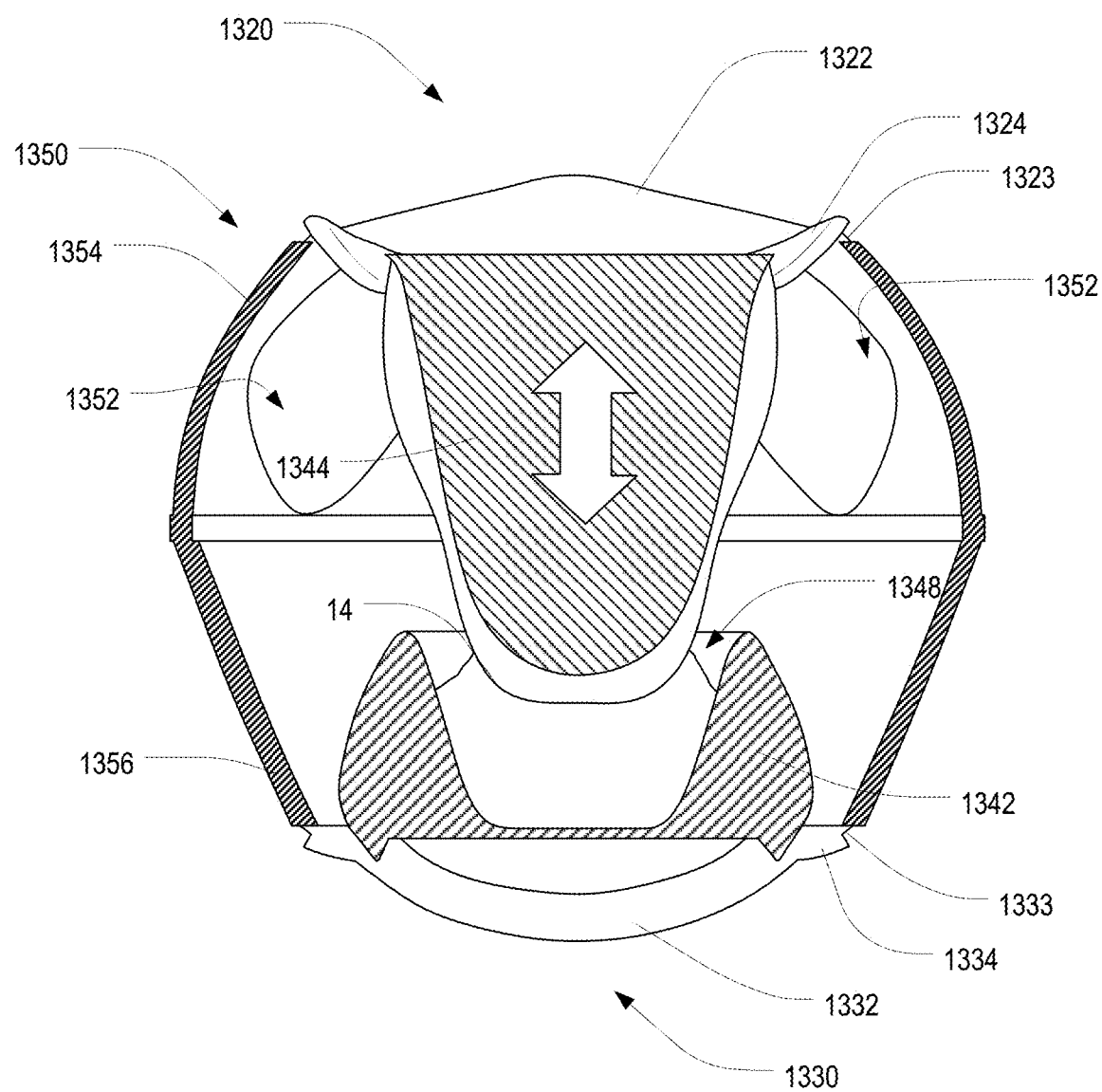
FIG. 2C is a front cross-sectional view of the pet medicine dispenser of FIG. 2B, shown in a partially actuated state.

FIG. 2C is a front cross-sectional view of the pet medicine dispenser 1310 of FIG. 2B, shown in a partially actuated state. When sufficient force is applied, the resilient skirts 1324,1334 allow the pad actuators 1322,1332 to be depressed relative to hollow ball structure 1350, thereby pushing the end of the pestle 1344 into the well 1348 of the mortar 1342. (It will be appreciated that only the top assembly 1320 is shown in its actuated state in FIG. 2C.) Because the skirts 1324,1334 are resilient, the pad actuators 1322, 1332 preferably return to the state shown in FIG. 1E when the applied force is removed. The skirts, baffles, or other structures 1324,1334 are preferably designed such that the amount of force required to overcome their outward bias is within a range corresponding to the activities of the pet 12 with which the dispenser 1310 is intended to be used. Such activities preferably incur biting, chewing, and/or tonguing the dispenser 1310 and/or using paws to hold and/or squeeze the dispenser 1310. Various surface features, for example including depressions and cavities like those shown in FIGS. 1A-1G, may be provided on the pad actuators 1322,1332 to provide additional texture and grip for the pet 12.

With the lower actuator assembly 1330 separated from the hollow ball structure 1350 and/or the lower shell half 1352 separated from the upper shell half 1354, the interior well 1348 of the mortar 1342 may be filled with medicine 14 to a desired capacity. Fill lines (not shown) may be provided to aid in measuring out a desired dosage of the medicine 14. The lower actuator assembly 1330 is then recoupled to the bottom of the hollow ball structure 1350. Subsequently, the medicine 14 may begin to spill out of the mortar 1342 and out through the windows 1352. Particularly when the medicine 14 is in paste or semi-solid form, this process is particularly facilitated when one or both actuator assemblies 1320,1330 are depressed, thereby pushing the end of the pestle 1344 into the medicine 14 contained in the mortar 1342. Such action tends to cause the medicine 14 to spill out of the sides of the mortar 1342 and out the windows 1352. Additional dispersal of the medicine 14 occurs as the medicine 14 begins to stick to the pestle 1344 and any protuberances or other surface features thereon. As the pet medicine dispenser 1310 is manipulated, the medicine 14 is broken apart and alternately sticks to the pestle 1344 and falls off and out through the windows 52. In at least some instances, the pet 12 may further assist in the process using its tongue by extending its tongue through the windows 1352 to reach the mortar 1342, pestle 1344, and the medicine 14 itself. In short, when the well 1348 of the mortar 1342 is filled with medicine 14, and the dispenser 1310 is then provided to a pet 12, the pet begins using its mouth to play with the toy 1310, the medicine 14 tends to spill out of the mortar 1342 through a variety of means and subsequently disperses out through the ball shell windows 1352 and into the pet's mouth.

Figure 3A:
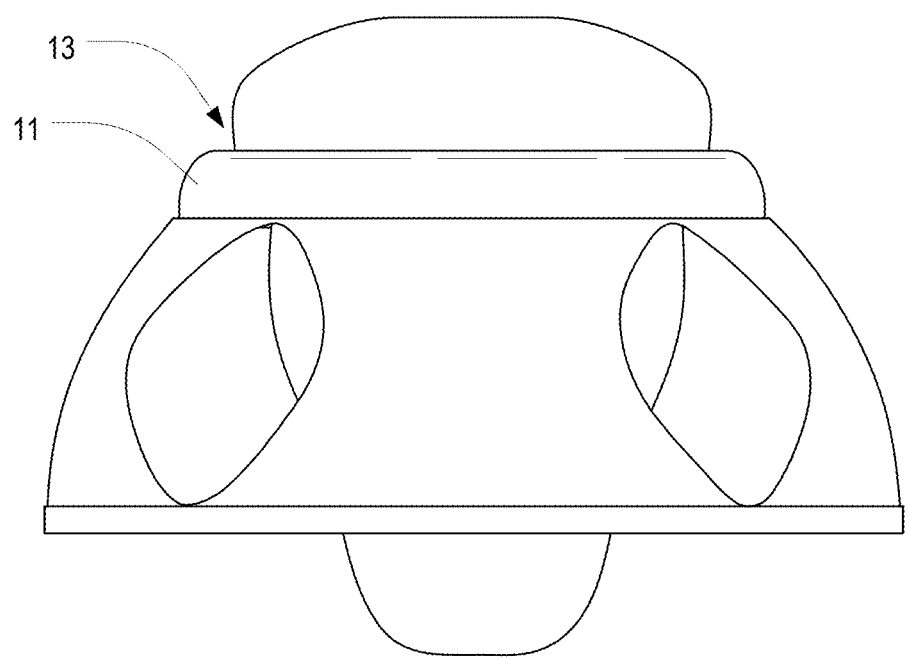
FIG. 3A is a side view of portions of a pet medicine dispenser utilizing a button-type actuator assembly, shown in a non-depressed state.
Figure 3B:
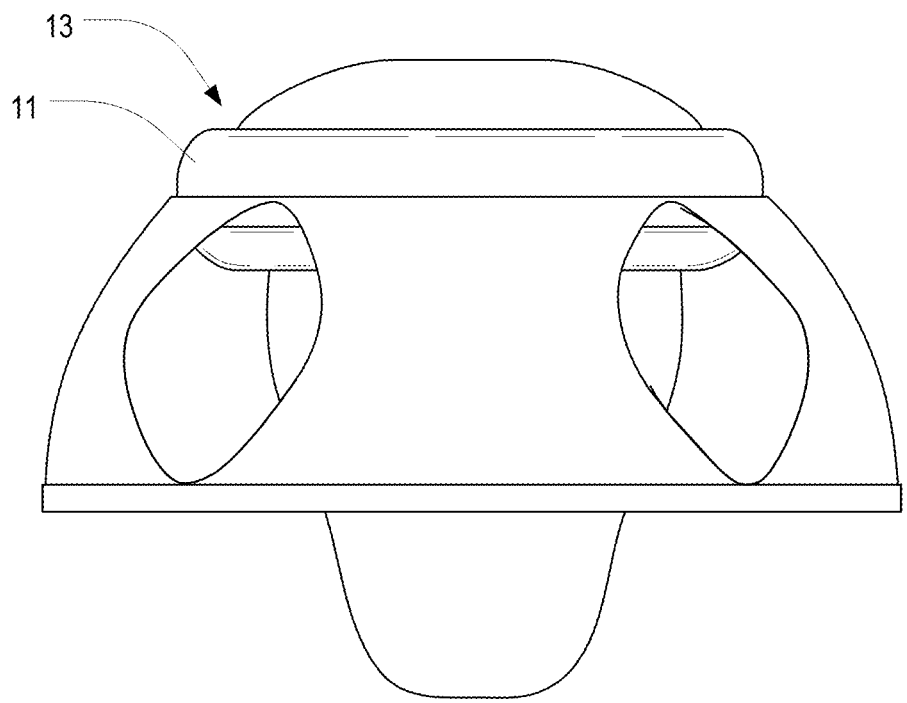
FIG. 3B is a side view of portions of a pet medicine dispenser utilizing a button-type actuator assembly, shown in a depressed state.
Figure 4:
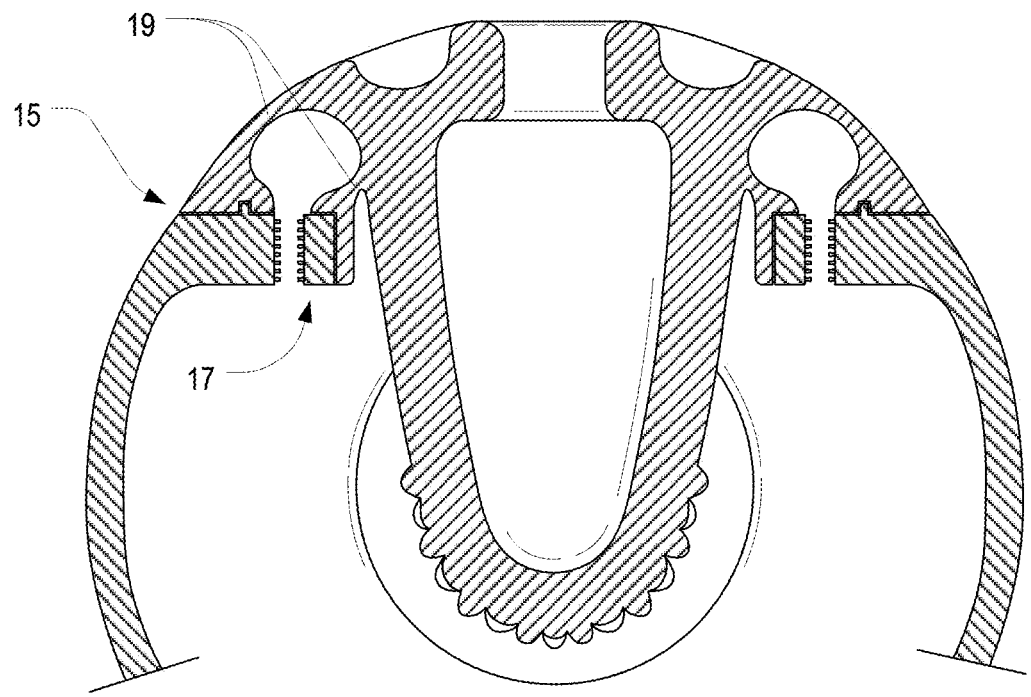
FIG. 4 is a fragmentary side cross-sectional view of portions of a pet medicine dispenser utilizing a modified skirt-type actuator assembly.

The actuator assemblies may be embodied in a variety of ways, utilizing various operational mechanisms. One actuator assembly is shown in FIGS. 1A-1G, while another actuator assembly is shown in FIGS. 2A-2C. FIGS. 3A and 3B are side views of portions of a pet medicine dispenser utilizing a button-type actuator assembly, shown in a non-depressed and a depressed state, respectively. The pet medicine dispenser of FIGS. 3A and 3B is somewhat similar to the pet medicine dispenser 1310 of FIGS. 2A-2C, but includes a collar 11 and a cold joint vertical piston seam 13. FIG. 4 is a fragmentary side cross-sectional view of portions of a pet medicine dispenser utilizing a modified skirt-type actuator assembly. The pet medicine dispenser of FIG. 4 is somewhat similar to the pet medicine dispenser 10 of FIGS. 1A-1G, but a tongue and groove cold joint 15 is utilized, as is an interior ring and thread joint 17. Also, various areas 19 of the actuator assembly utilize reduced cross-sections to facilitate flex direction and operation. It will be appreciated that in various embodiments, the actuators and actuator assemblies described herein may be interchanged with each other, modified, and otherwise adapted as desired without departing from the scope of the present invention.

Figure 5:
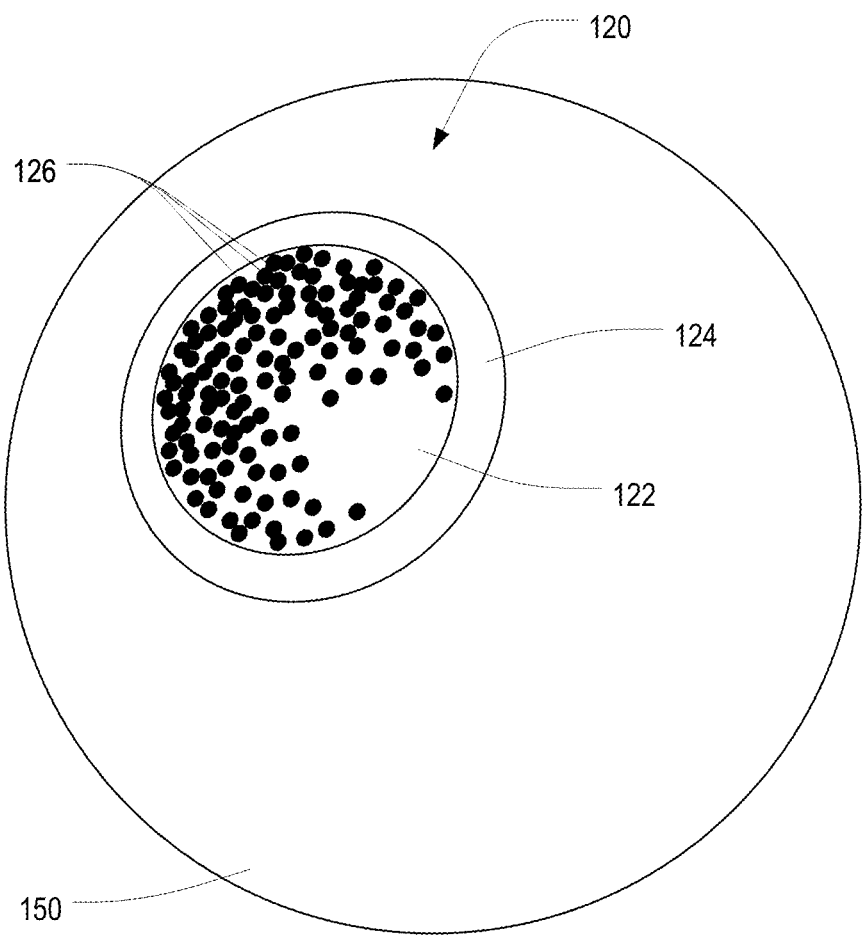
FIG. 5 is a perspective view of a "pad ball" pet toy for dispensing medicine in accordance with one or more preferred embodiments of the present invention.

FIG. 5 is a perspective view of a "pad ball" pet toy 110 for dispensing medicine in accordance with one or more preferred embodiments of the present invention. As shown therein, this pet medicine dispenser 110 includes a ball structure 150 and one or more dispenser outlets in the form of pad assemblies 120 disposed on, or embedded in, the surface of the support structure 150. In some embodiments, the ball structure 150 may be solid, while in others the ball structure 150 may be hollow. Each pad assembly 120 includes a medicine distribution pad 122, preferably having a textured surface 126 and absorbent qualities, that is retained on or in the surface of the ball structure 150 via a retention seal 124. Liquid medicine 14 may be topically applied to the pad 122 and at least partially absorbed thereby. When the pet medicine dispenser 110 is then provided to a pet 12, and the pet begins using its mouth to play with the toy 110, the medicine 14 tends to leak or be squeezed out of the pads 122 and into the pet's mouth.

Figure 6A:
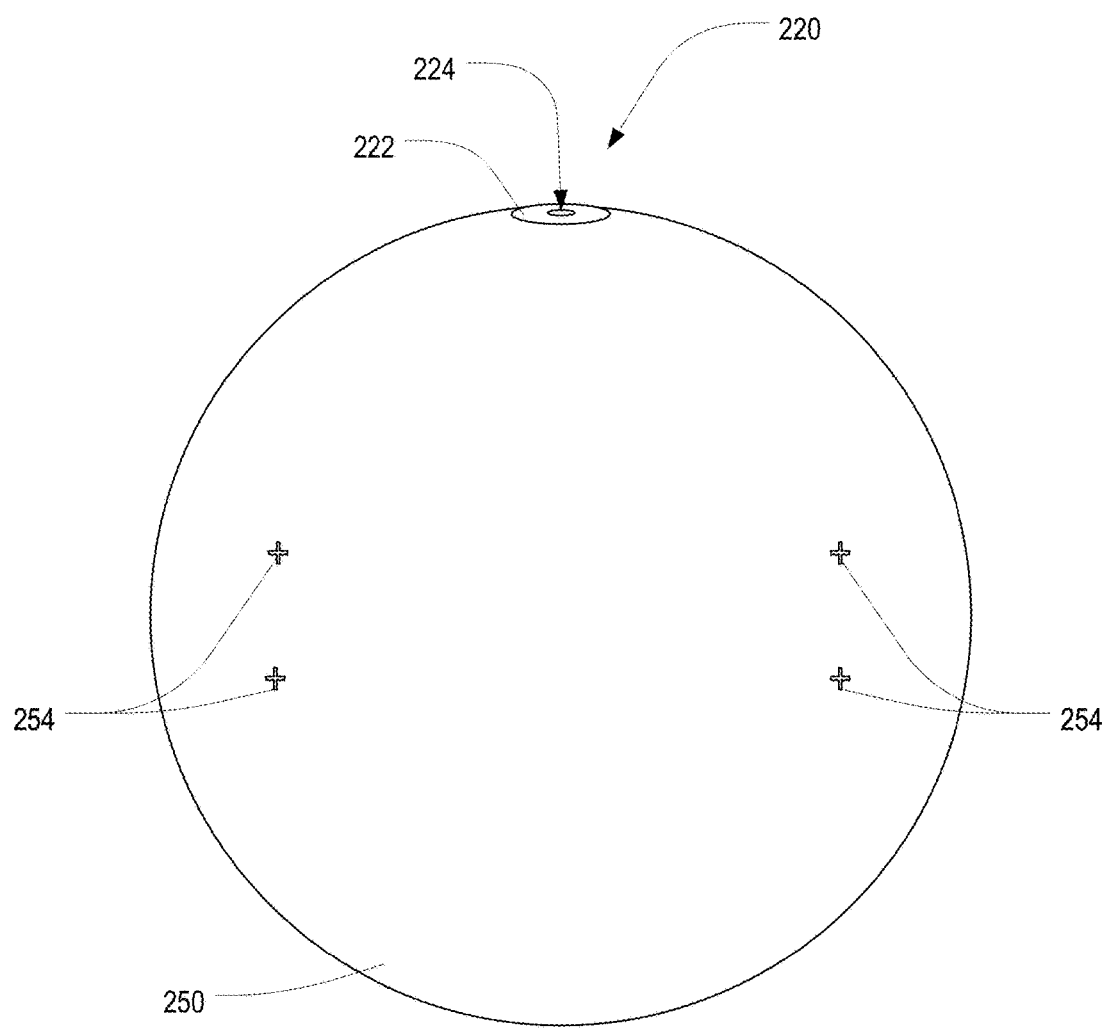
FIG. 6A is a perspective view of a "squishy ball" pet toy for dispensing medicine in accordance with one or more preferred embodiments of the present invention.
Figure 6B:
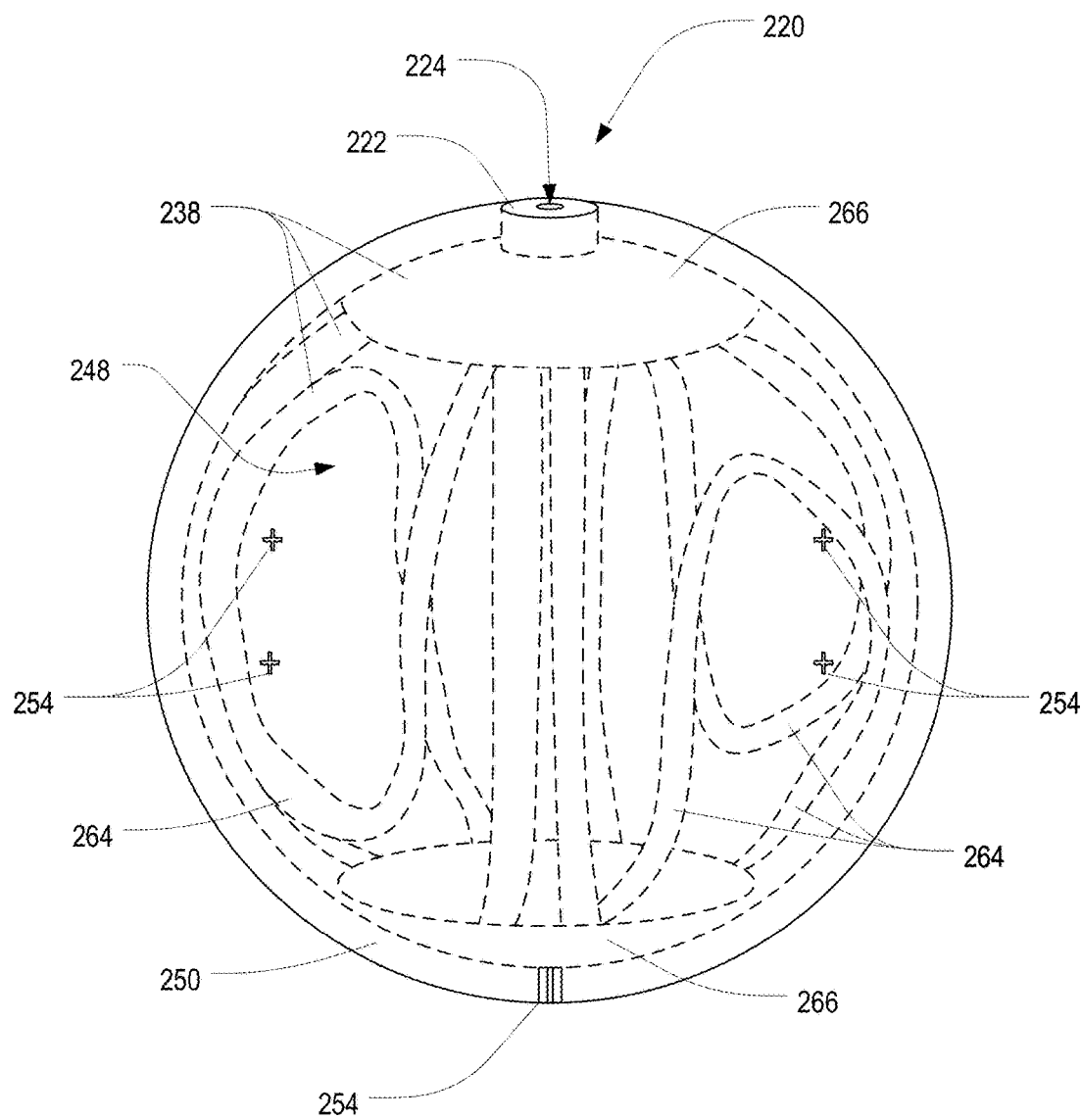
FIG. 6B is a perspective view of the pet medicine dispenser of FIG. 6A, wherein portions are shown partially transparent for illustrative purposes.

FIG. 6A is a perspective view of a "squishy ball" pet toy 210 for dispensing medicine in accordance with one or more preferred embodiments of the present invention, and FIG. 6B is a perspective view of the pet medicine dispenser 210 of FIG. 6A, wherein portions are shown partially transparent for illustrative purposes. As shown therein, the pet medicine dispenser 210 includes a hollow ball structure or shell 250, an interior skeleton structure 238, and a fill port 220. The ball shell 250 defines an interior well or other cavity 248 in which the skeleton structure 238 is arranged. The skeleton structure 238 includes a plurality of ribs 264 radiating from and between a pair of polar structures 266 located in the top and bottom of the ball shell 250. At least some portions of the skeleton structure 238 are preferably flexible, resilient, and durable so as to provide some reinforcement for the hollow shell 250 but sufficient flexibility to give the toy 210 a flex pattern imparting a "squishy" feel that appeals to the pet 12 when chewing and/or otherwise playing with the toy 210. In at least some embodiments, the ball shell 250 has both thermoplastic and elastomeric properties, and is preferably made of a thermoplastic elastomer (TPE). Furthermore, in at least some embodiments, the ball shell 250 may be partially or completely made of transparent or translucent material. In at least some embodiments, the skeleton structure 238 is made of rubber. In the illustrated embodiment, the ball shell is spherical, but other shapes, such as other ball shapes, may alternatively be utilized.

The fill port 220 includes a plug structure 222 defining an injection aperture 224. Using a thin-radius nozzle (not shown), the injection aperture 224 may be penetrated such that liquid medicine may be injected into the interior well 248. A plurality of dispenser outlets in the form of micro holes 254 are disposed in the ball shell 250 such that the liquid medicine 14 may leak out from the interior well 248 under at least some conditions. In particular, when the pet medicine dispenser 210 is at least partially filled with liquid medicine 14 and then provided to a pet 12, and the pet begins using its mouth to play with the toy 210, the medicine 14 tends to leak through the micro holes 254 and into the pet's mouth.

Figure 7A:
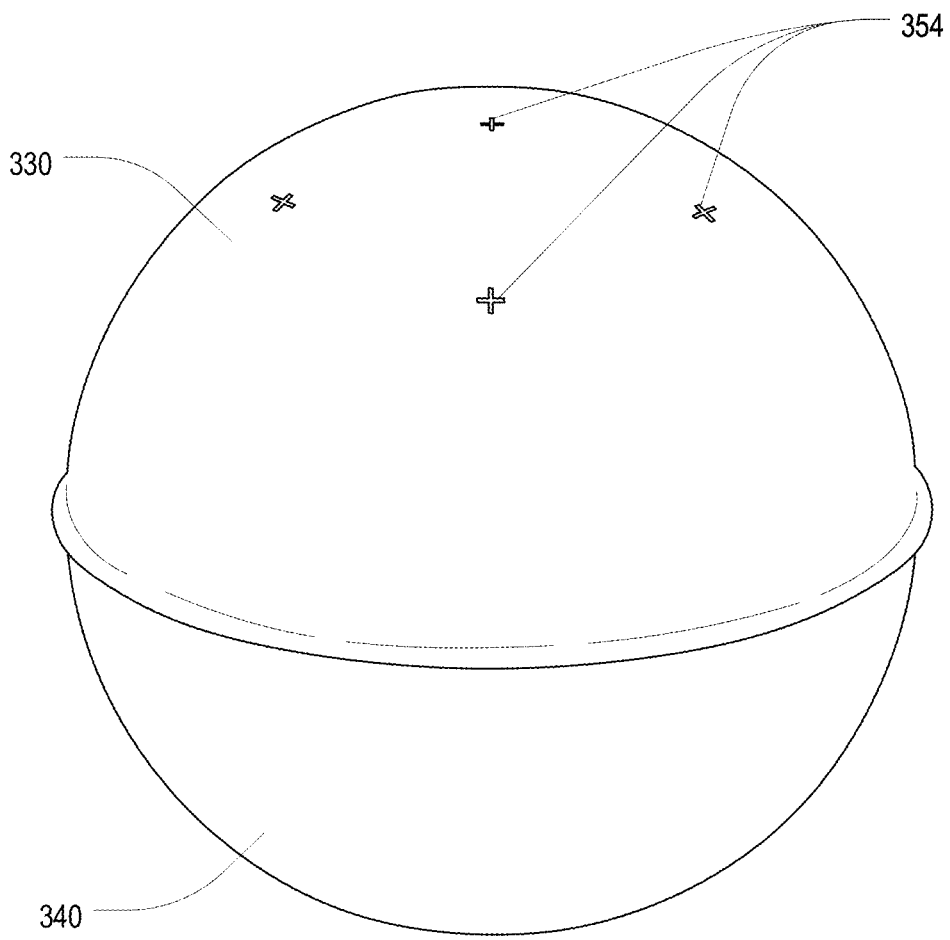
FIG. 7A is a perspective view of a "squishy half ball" pet toy for dispensing medicine in accordance with one or more preferred embodiments of the present invention.
Figure 7B:
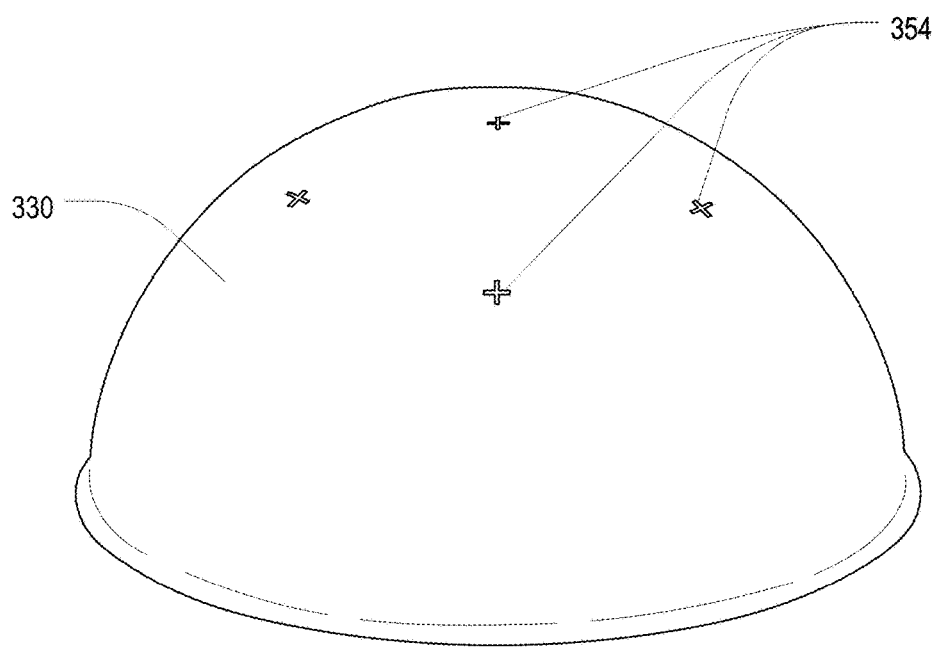
FIG. 7B is a perspective view of the pet medicine dispenser of FIG. 7A, shown in an open state.
Figure 7B:
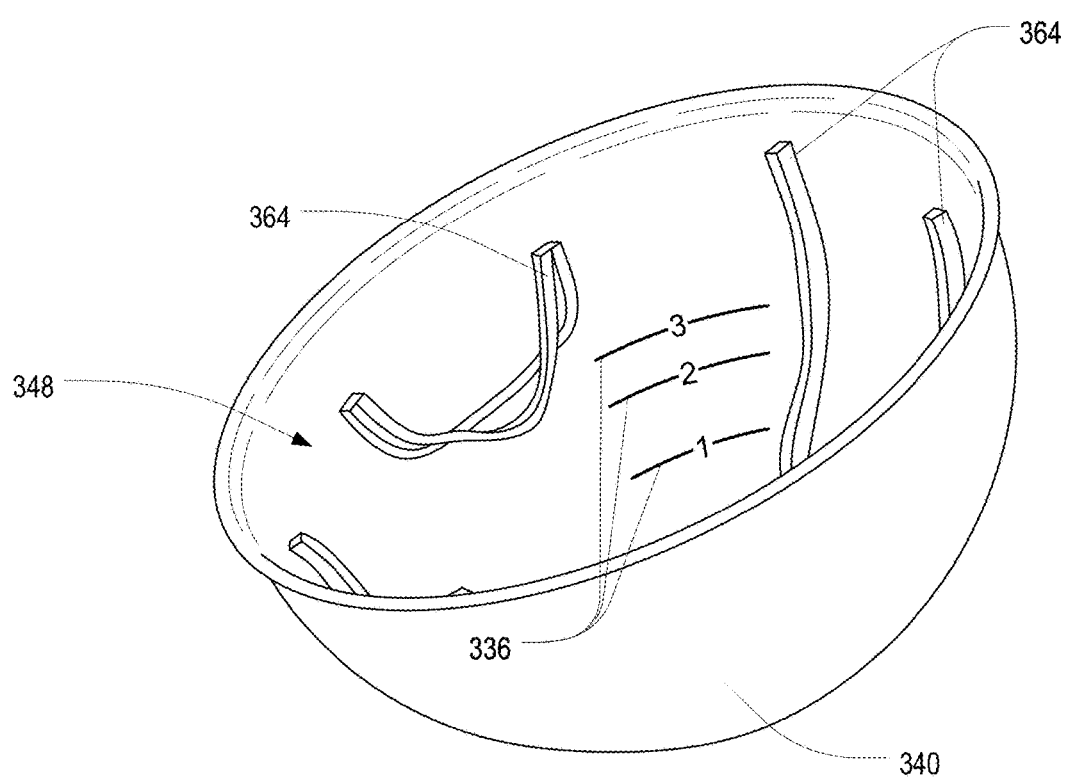

FIG. 7A is a perspective view of a "squishy half ball" pet toy 310 for dispensing medicine in accordance with one or more preferred embodiments of the present invention, and FIG. 7B is a perspective view of the pet medicine dispenser 310 of FIG. 7A, shown in an open state. As shown therein, the pet medicine dispenser 310 includes a hollow ball structure or shell, formed from two halves 330,340, and an interior skeleton structure. The two halves 330,340 of the ball shell define an interior well or other cavity 348 in which the skeleton structure is arranged. The skeleton structure includes a plurality of ribs 364 distributed around the interior of the ball shell. At least some portions of the skeleton structure are preferably flexible, resilient, and durable so as to provide some reinforcement for the hollow shell but sufficient flexibility to give the toy 310 a flex pattern imparting a "squishy" feel that appeals to the pet 12 when chewing and/or otherwise playing with the toy 310. In at least some embodiments, the ball shell has both thermoplastic and elastomeric properties, and is preferably made of a thermoplastic elastomer (TPE). In at least some embodiments, one or both shell halves 330,340 may be partially or completely made of transparent or translucent material. In the illustrated embodiment, the ball shell is spherical, but other shapes, such as other ball shapes, may alternatively be utilized. Furthermore, although the illustrated dispenser 310 has two equal-sized half sections, the dispenser 310 may alternatively be made of two sections of non-equal size.

With the lower half 340 separated from the upper half 330, the lower half 340 may be filled with medicine 14 to a desired capacity. Fill lines 336 may be provided to aid in measuring out a desired dosage of the medicine 14. A plurality of dispenser outlets in the form of micro holes 354 are disposed in one or both halves 330,340 of the ball shell such that the liquid medicine 14 may leak out from the interior well 348 under at least some conditions. In particular, when the pet medicine dispenser 310 is at least partially filled with liquid medicine 14 and then provided to a pet 12, and the pet begins using its mouth to play with the toy 310, the medicine 14 tends to leak through the micro holes 354 and into the pet's mouth.

Figure 8A:
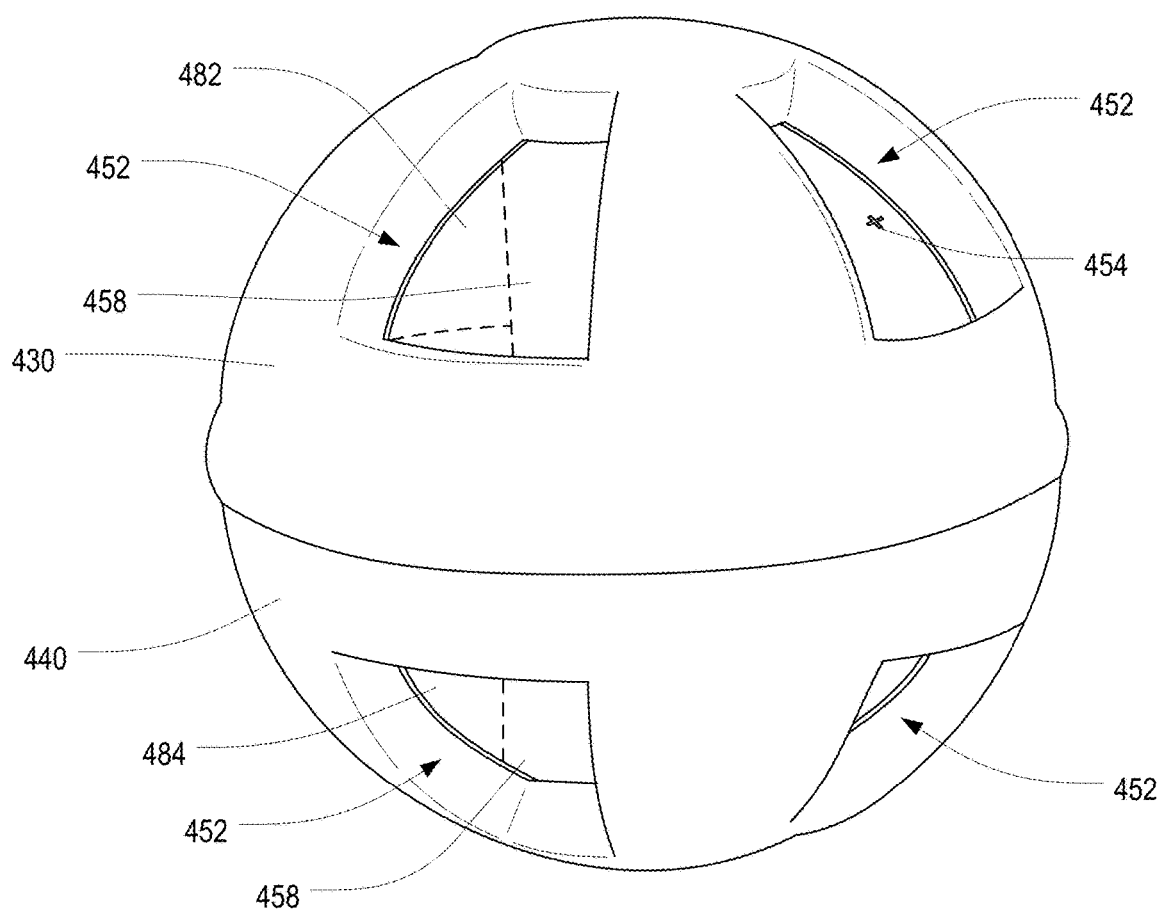
FIG. 8A is a perspective view of a "squishy half rib ball" pet toy for dispensing medicine in accordance with one or more preferred embodiments of the present invention.
Figure 8B:
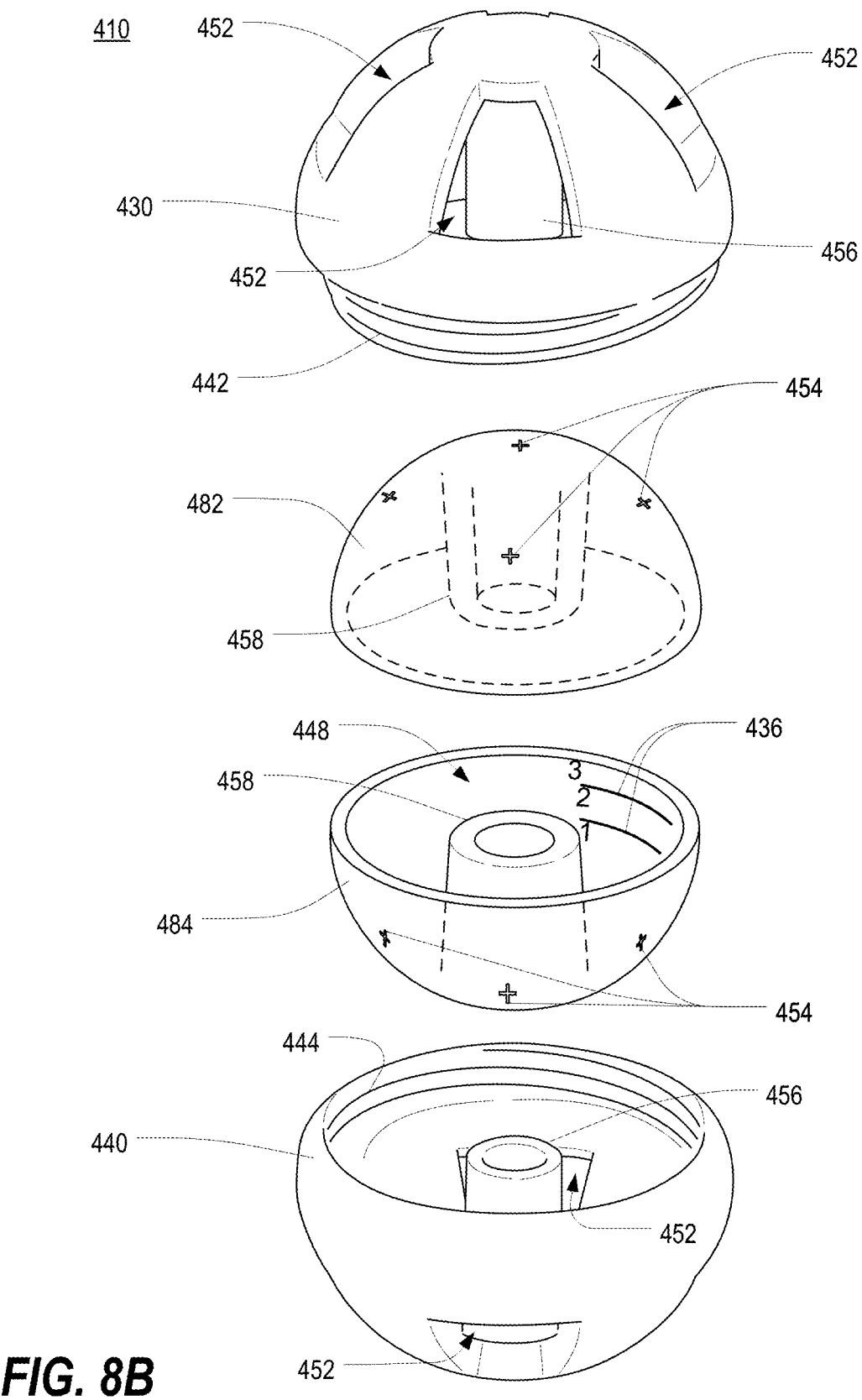
FIG. 8B is an exploded perspective view of the pet medicine dispenser of FIG. 8A.

FIG. 8A is a perspective view of a "squishy half rib ball" pet toy 410 for dispensing medicine in accordance with one or more preferred embodiments of the present invention, and FIG. 8B is an exploded perspective view of the pet medicine dispenser 410 of FIG. 8A. As shown therein, the pet medicine dispenser 410 includes a two-piece exterior shell 430, 440 and a two-piece interior bladder 482,484. Each of the exterior shell halves 430,440 includes a plurality of windows 452 and an axial post 456 that extends inward from the center of the respective shell half 430,440. The two shell halves 430,440 may be attached together using, for example, male and female threaded fittings 442,444. One or both halves 430,440 may be made of solid rubber and may have extra thick walls, particularly in the area of the threaded fittings 442,444. The rubber, for example, may have a hardness of 0.90 durometers. In at least some embodiments, one or both bladder halves 482,484 have both thermoplastic and elastomeric properties, and is preferably made of a thermoplastic elastomer (TPE) having a hardness of 0.50 durometers, giving it a "squishy" feel. Furthermore, in at least some embodiments, one or both shell halves 430,440 and/or one or both bladder halves 482,484 may be partially or completely made of transparent or translucent material. In the illustrated embodiment, the shell halves 430,440 and the bladder halves 482,484 are each approximately hemispherical, such that the combined ball shell and combined bladder are each approximately spherical, but other shapes, such as other ball shapes, may alternatively be utilized.

Each of the bladder halves 482,484 includes an axial post 458, having a hollow interior, that extends inward from the center of the respective bladder half 482,484. The axial posts 456 of the exterior shell halves 430,440 fit into the axial posts 458 of the bladder halves 482,484. As a supplement or replacement for the threaded fittings 442,444 described above, the axial posts 456 may be have mating threaded couplings, or a screw or fastener may be inserted axially through the posts 456,458, so as to enable the two shell halves 430,440 to be attached together. The two bladder halves 482,484 define an interior well or other cavity 448. With the lower bladder half 484 separated from the upper half 482, the lower half 484 may be filled with medicine 14 to a desired capacity. Fill lines 436 may be provided to aid in measuring out a desired dosage of the medicine 14. A plurality of dispenser outlets in the form of micro holes 454 are disposed in one or both halves 482,484 of the bladder such that the liquid medicine 14 may leak out from the interior well 448 under at least some conditions. In particular, when the pet medicine dispenser 410 is at least partially filled with liquid medicine 14 and then provided to a pet 12, and the pet begins using its mouth to play with the toy 410, the medicine 14 tends to leak through the micro holes 454, out through the ball shell windows 452, and into the pet's mouth.

Figure 9A:
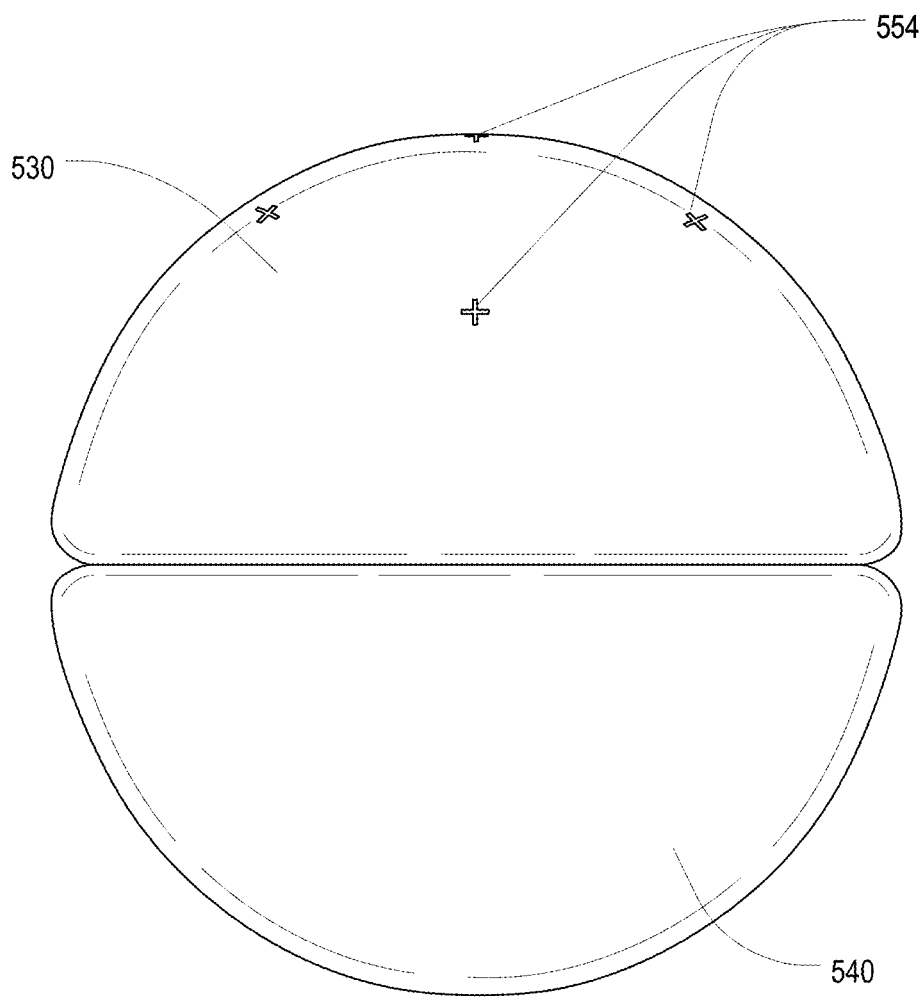
FIG. 9A is a perspective view of a "squishy solid ball" pet toy for dispensing medicine in accordance with one or more preferred embodiments of the present invention.
Figure 9B:
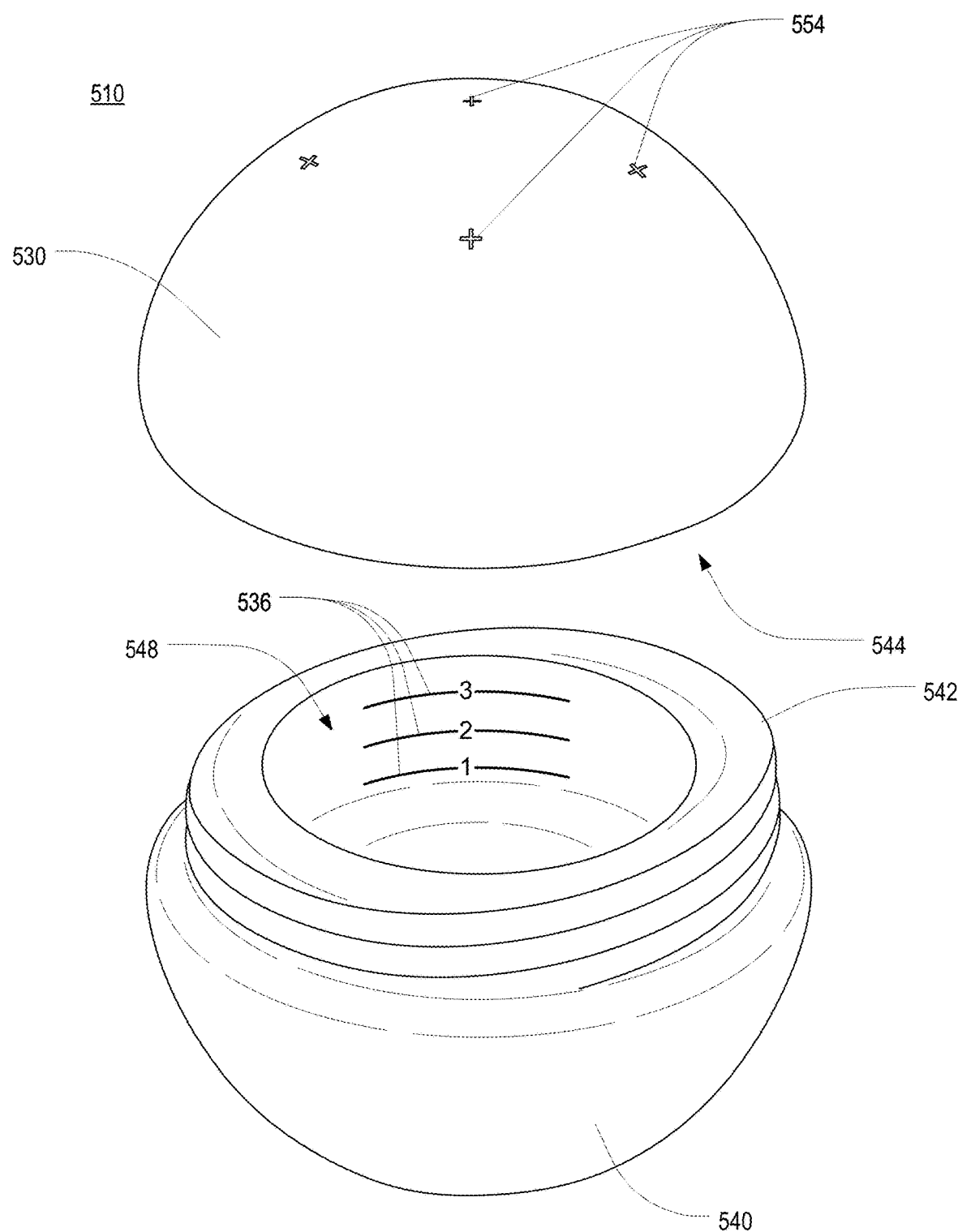
FIG. 9B is a perspective view of the pet medicine dispenser of FIG. 9A, shown in an open state.

FIG. 9A is a perspective view of a "squishy solid ball" pet toy 510 for dispensing medicine in accordance with one or more preferred embodiments of the present invention, and FIG. 9B is a perspective view of the pet medicine dispenser 510 of FIG. 9A, shown in an open state. As shown therein, the pet medicine dispenser 510 includes a hollow ball structure or shell, formed from two halves 530,540 defining an interior well or other cavity 548. The two shell halves 530,540 may be attached together using, for example, male and female threaded fittings 542,544. One or both halves 530,540 may be made of solid rubber and may have extra thick walls, particularly in the area of the threaded fittings 542,544. In at least some embodiments, one or both shell halves 530,540 may be partially or completely made of transparent or translucent material. In the illustrated embodiment, the ball shell is spherical, but other shapes, such as other ball shapes, may alternatively be utilized. Furthermore, although the illustrated dispenser 510 has two equal-sized half sections, the dispenser 510 may alternatively be made of two sections of non-equal size.

With the lower half 540 separated from the upper half 530, the lower half 540 may be filled with medicine 14 to a desired capacity. Fill lines 536 may be provided to aid in measuring out a desired dosage of the medicine 14. A plurality of dispenser outlets in the form of micro holes 554 are disposed in one or both halves 530,540 of the ball shell such that the liquid medicine 14 may leak out from the interior well 548 under at least some conditions. In particular, when the pet medicine dispenser 510 is at least partially filled with liquid medicine 14 and then provided to a pet 12, and the pet begins using its mouth to play with the toy 510, the medicine 14 tends to leak through the micro holes 554 and into the pet's mouth.

Figure 10A:
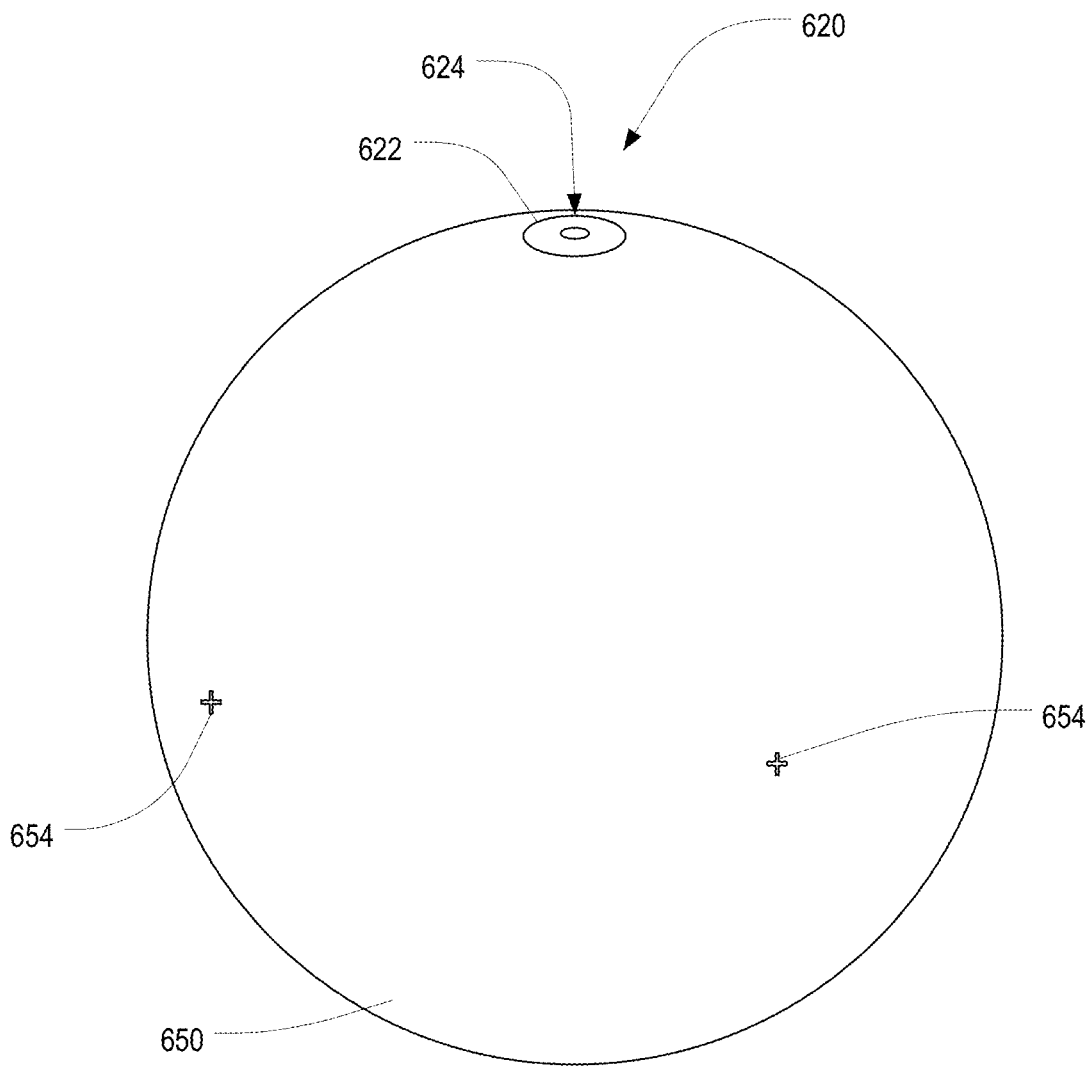
FIG. 10A is a perspective view of a "rib ball" pet toy for dispensing medicine in accordance with one or more preferred embodiments of the present invention.
Figure 10B:
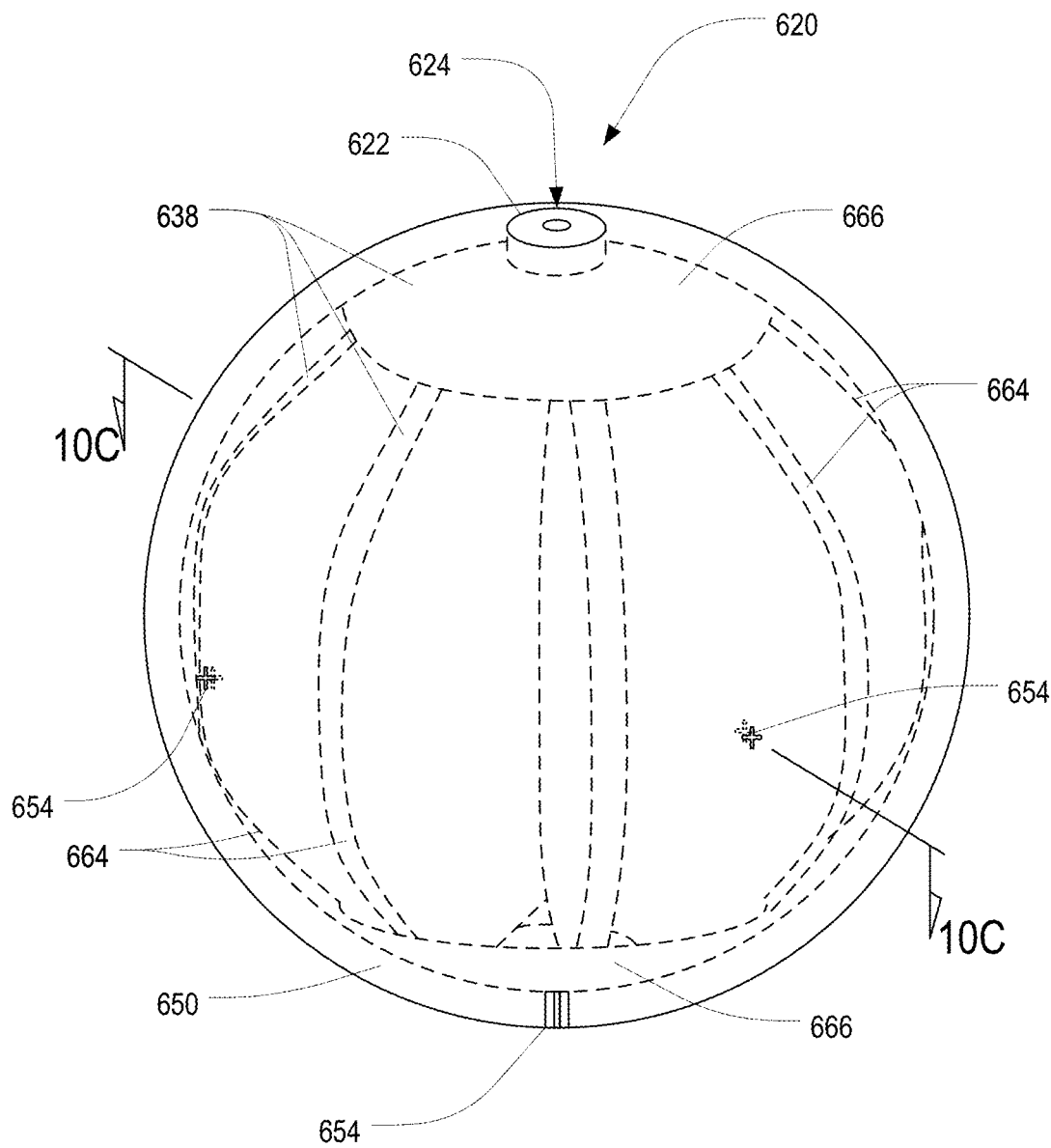
FIG. 10B is a perspective view of the pet medicine dispenser of FIG. 10A, wherein portions are shown partially transparent for illustrative purposes.
Figure 10C:
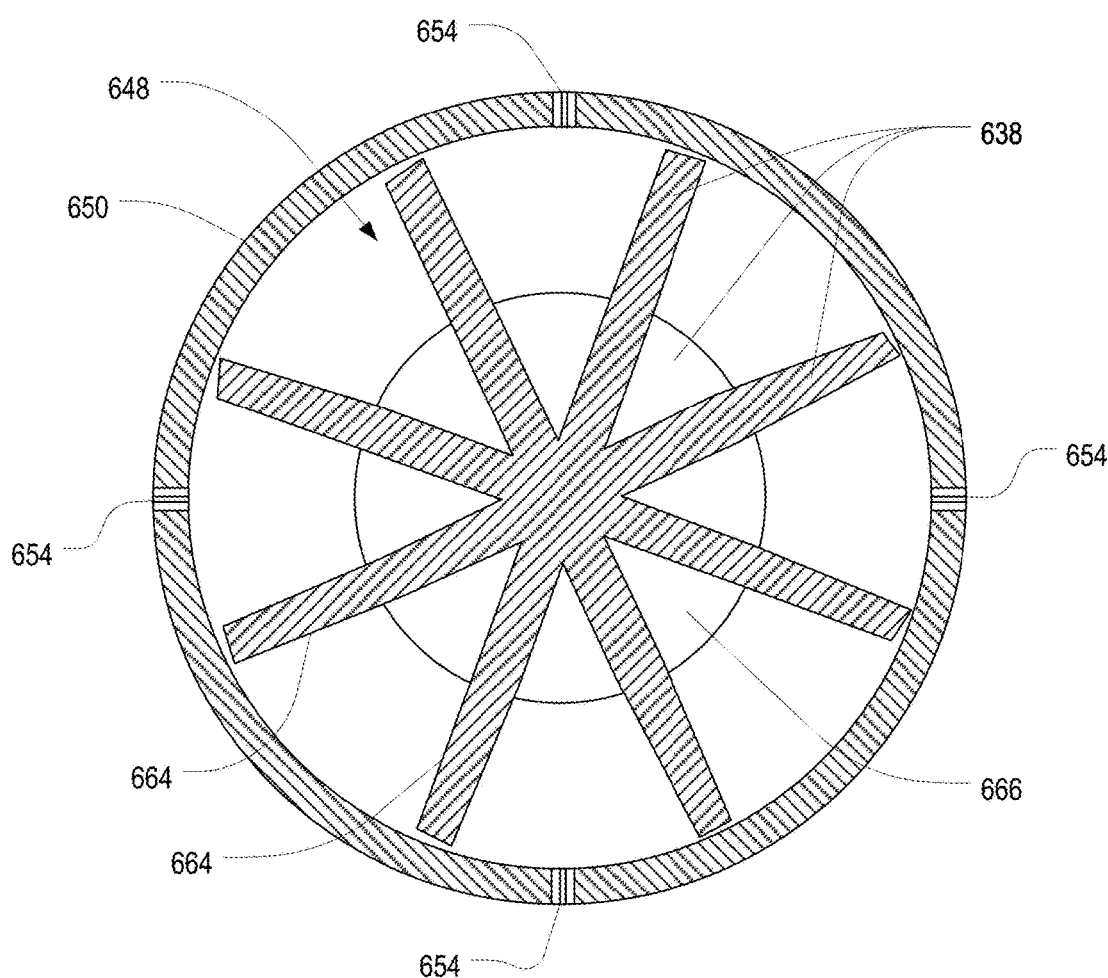
FIG. 10C is a front cross-sectional view of the pet medicine dispenser of FIG. 10B, taken along line 10C-10C.

FIG. 10A is a perspective view of a "rib ball" pet toy 610 for dispensing medicine in accordance with one or more preferred embodiments of the present invention; FIG. 10B is a perspective view of the pet medicine dispenser 610 of FIG. 10A, wherein portions are shown partially transparent for illustrative purposes; and FIG. 10C is a front cross-sectional view of the pet medicine dispenser of FIG. 10B, taken along line 10C-10C. As shown therein, the pet medicine dispenser 610 includes a hollow ball structure or shell 650, an interior skeleton structure 638, and a fill port 620. The ball shell 650 defines an interior well or other cavity 648 in which the skeleton structure 638 is arranged. The skeleton structure 638 includes a plurality of ribs 664 radiating from and between a pair of polar structures 666 located in the top and bottom of the ball shell 650. At least some portions of the skeleton structure 638 are preferably resilient and durable so as to provide some reinforcement for the flexible hollow shell 650. In at least some embodiments, portions of the skeleton structure 638 may also be sufficiently flexible to give the toy 610 a flex pattern imparting a "squishy" feel that appeals to the pet 12 when chewing and/or otherwise playing with the toy 610. In at least some embodiments, the ball shell 650 has both thermoplastic and elastomeric properties, and is preferably made of a thermoplastic elastomer (TPE), giving it a "squishy" feel. Furthermore, in at least some embodiments, the ball shell 650 may be partially or completely made of transparent or translucent material. In at least some embodiments, the skeleton structure 638 is made of rubber. In the illustrated embodiment, the ball shell is spherical, but other shapes, such as other ball shapes, may alternatively be utilized.

The fill port 620 includes a plug structure 622 defining an injection aperture 624. Using a thin-radius nozzle (not shown), the injection aperture 624 may be penetrated such that liquid medicine may be injected into the interior well 648. A plurality of dispenser outlets in the form of micro holes 654 are disposed in the ball shell 650 such that the liquid medicine 14 may leak out from the interior well 648 under at least some conditions. In particular, when the pet medicine dispenser 610 is at least partially filled with liquid medicine 14 and then provided to a pet 12, and the pet begins using its mouth to play with the toy 610, the medicine 14 tends to leak through the micro holes 654 and into the pet's mouth.

Figure 11A:
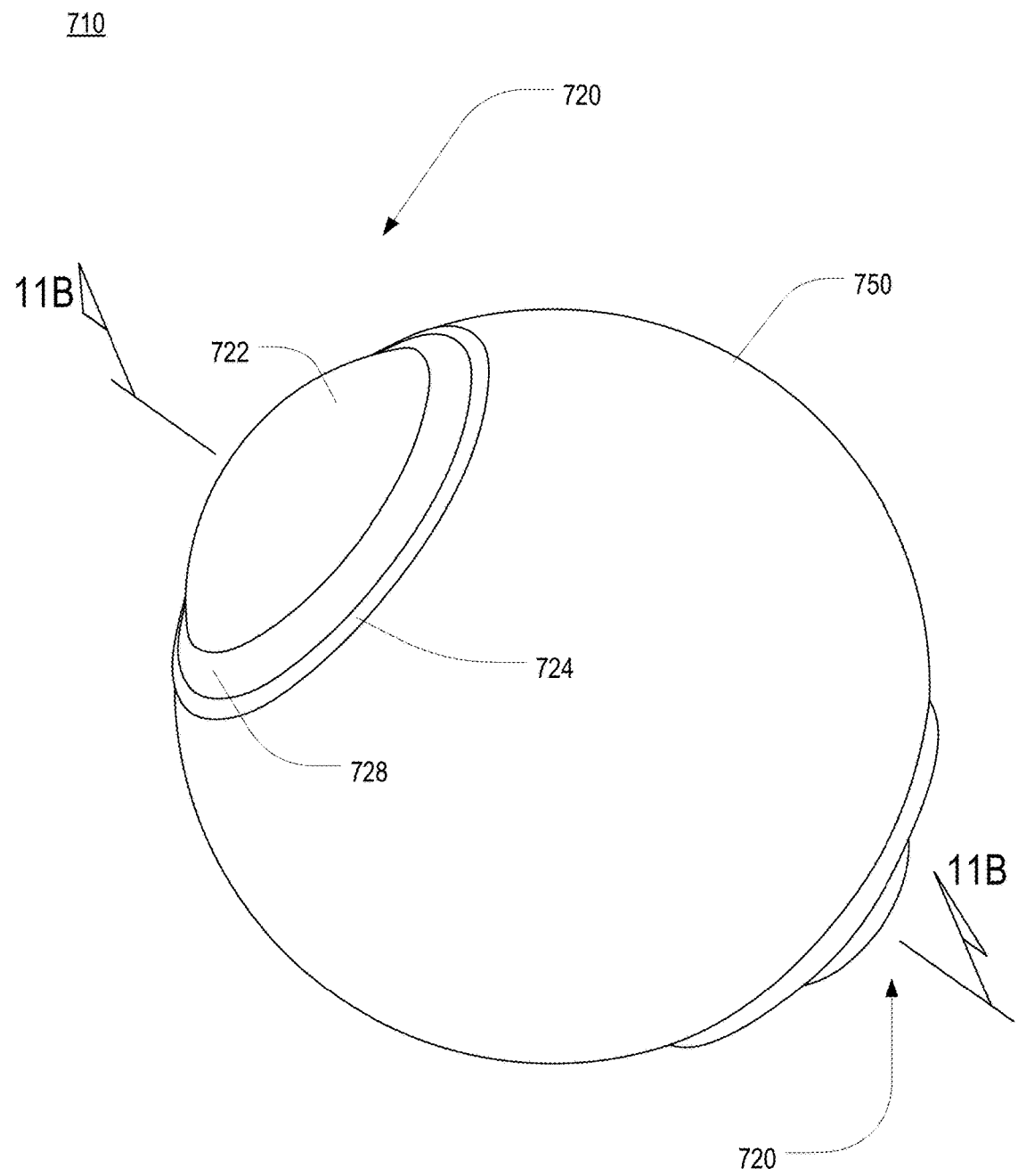
FIG. 11A is a perspective view of a "core ball" pet toy for dispensing medicine in accordance with one or more preferred embodiments of the present invention.
Figure 11B:
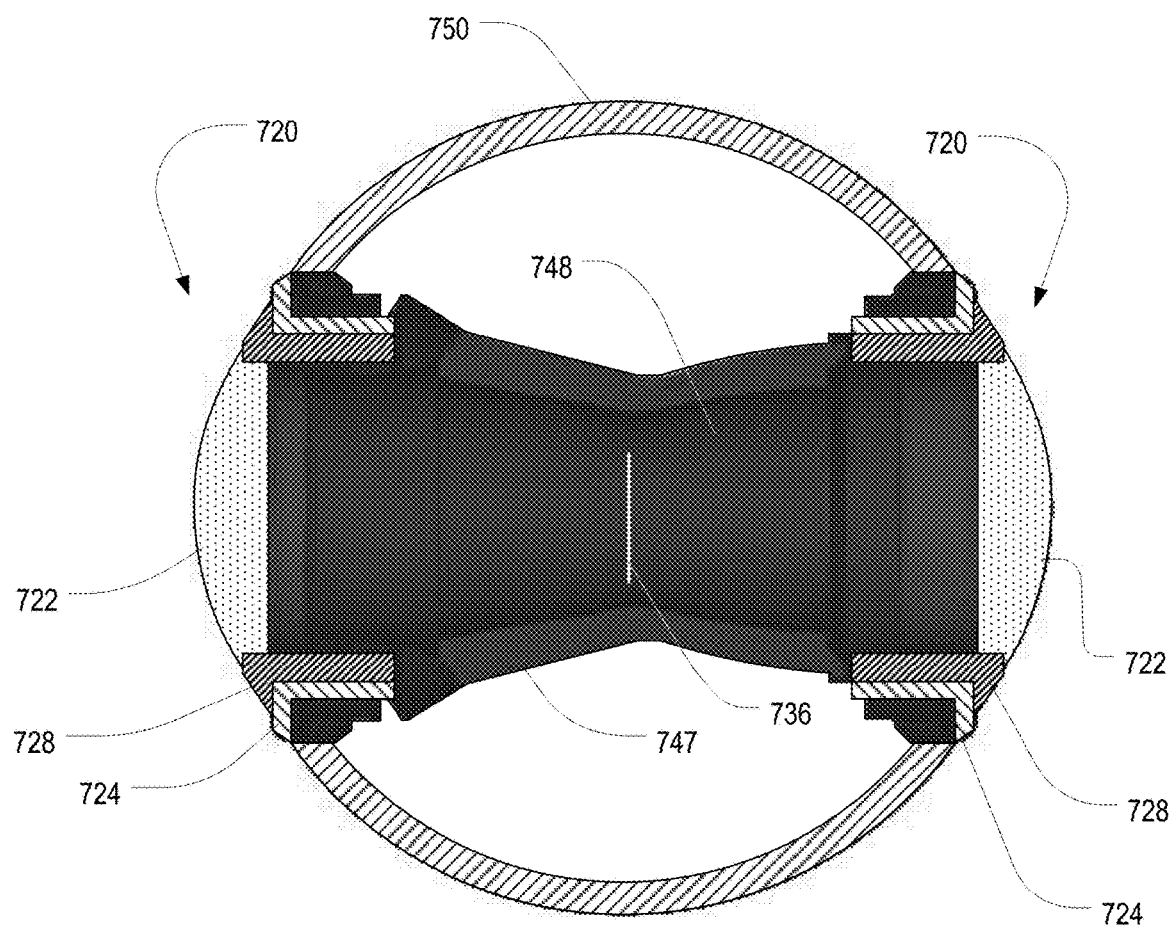
FIG. 11B is a front cross-sectional view of the pet medicine dispenser of FIG. 11A, taken along line 11B-11B.
Figure 11C:
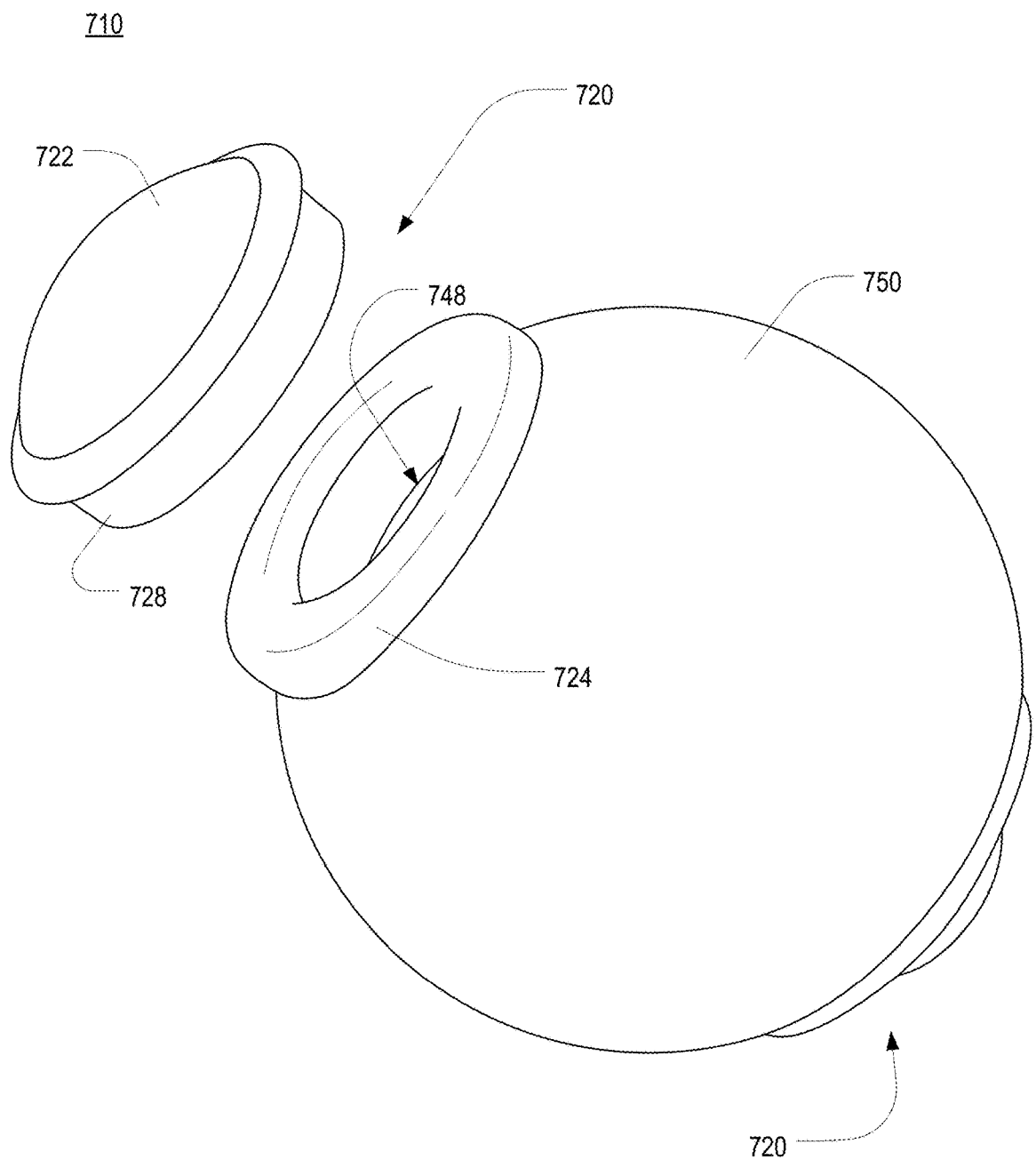
FIG. 11C is a perspective view of the pet medicine dispenser of FIG. 11A, shown with one medicine distribution pad and retainer ring removed from its seal.

FIG. 11A is a perspective view of a "core ball" pet toy 710 for dispensing medicine in accordance with one or more preferred embodiments of the present invention, and FIG. 11B is a front cross-sectional view of the pet medicine dispenser 710 of FIG. 11A, taken along line 11B-11B. As shown therein, this pet medicine dispenser 710 includes a ball structure 750, a reservoir 747, defining an interior well or other cavity 748, and one or more dispenser outlets in the form of pad assemblies 720. Each pad assembly 720 includes a medicine distribution pad 722, preferably having a textured surface and absorbent qualities, that is retained within a seal 724 via a removable retainer ring 728. Removal of the ring 728 exposes the interior well 748. In this regard, FIG. 11C is a perspective view of the pet medicine dispenser 710 of FIG. 11A, shown with one medicine distribution pad 722 and retainer ring 728 removed from its seal 724. In at least some embodiments, the seal 724 is a flexible membrane that receives and holds the retainer ring 728 in place via pressure and friction.

With the medicine distribution pad 722 and retainer ring 728 removed from its seal 724, the interior well 748 may be filled with medicine 14 to a desired capacity. One or more fill lines 736 may be provided to aid in measuring out a desired dosage of the medicine 14. The distribution pad 722 and retainer ring 728 may then be replaced in the seal 724. As the pet medicine dispenser 710 is moved, medicine 14 begins to seep into the distribution pads 722 where the medicine 14 can be delivered to a pet under at least some conditions. In particular, when the filled or partially-filled pet medicine dispenser 710 is provided to a pet 12, and the pet begins using its mouth to play with the toy 710, the medicine 14 tends seep into the pads 722 and then leak or be squeezed out of the pads 722 and into the pet's mouth.

Figure 12A:
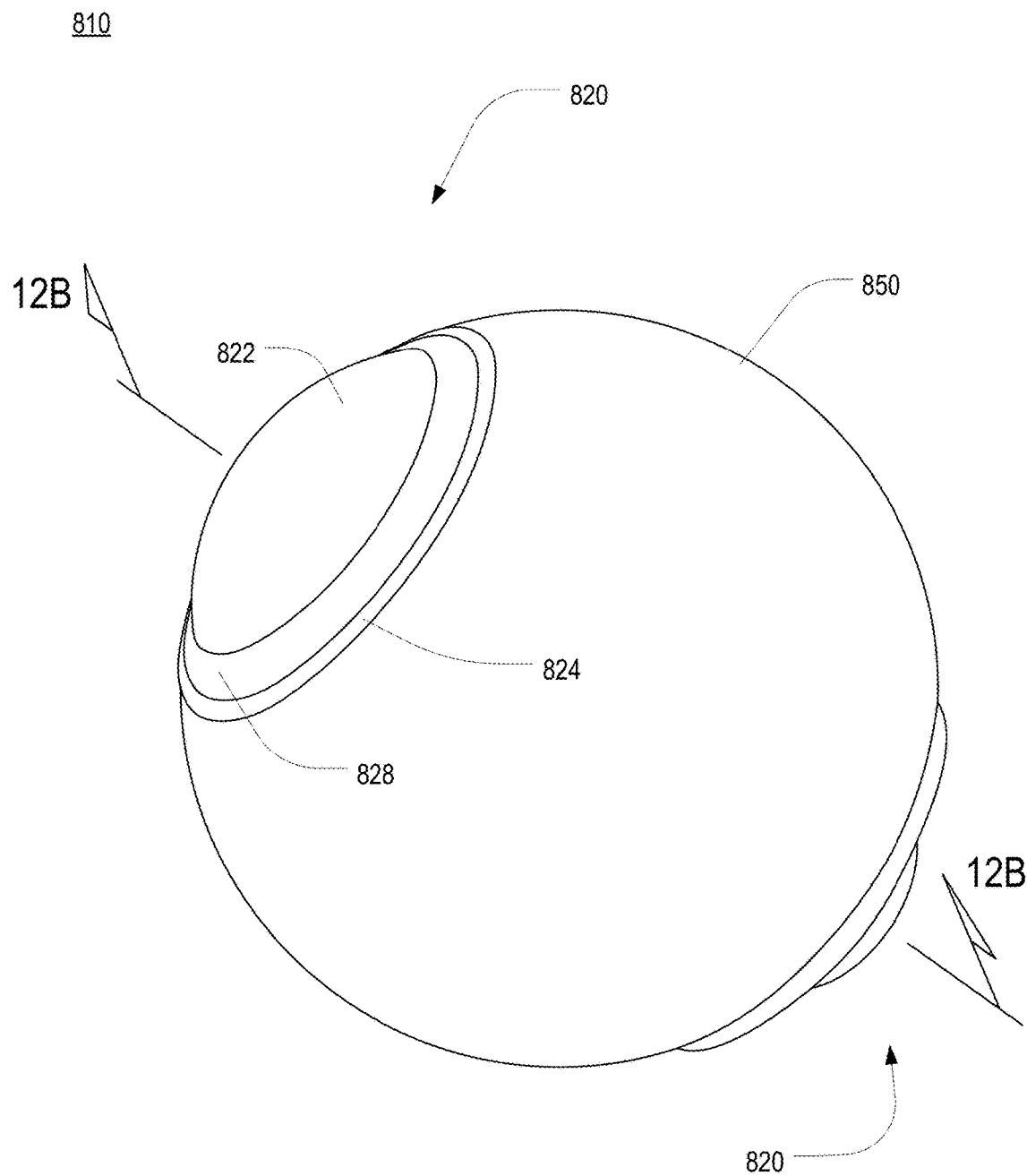
FIG. 12A is a perspective view of a "roller ball" pet toy for dispensing medicine in accordance with one or more preferred embodiments of the present invention.
Figure 12B:
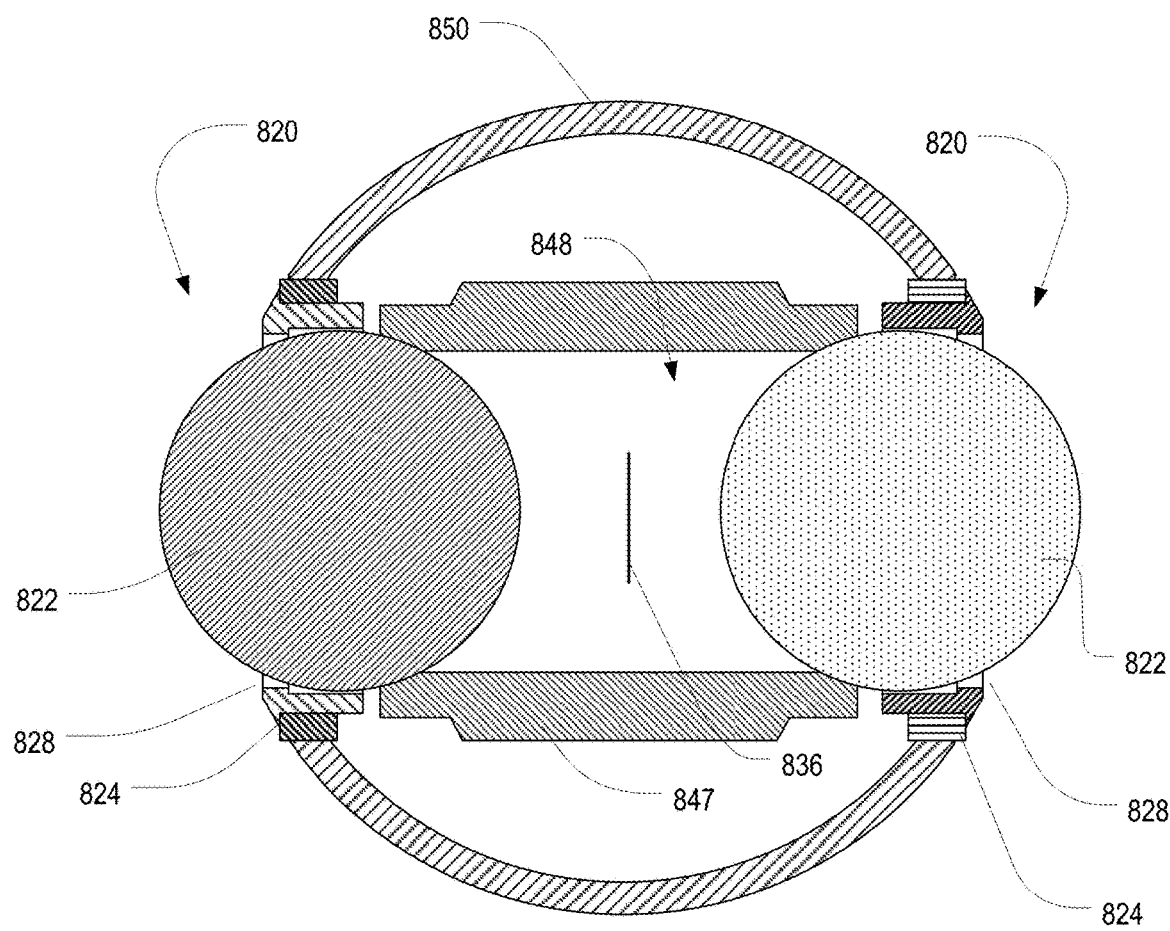
FIG. 12B is a front cross-sectional view of the pet medicine dispenser of FIG. 12A, taken along line 12B-12B.

FIG. 12A is a perspective view of a "roller ball" pet toy 810 for dispensing medicine in accordance with one or more preferred embodiments of the present invention, and FIG. 12B is a front cross-sectional view of the pet medicine dispenser 810 of FIG. 12A, taken along line 12B-12B. As shown therein, this pet medicine dispenser 810 includes a ball structure 850, a reservoir 847, defining an interior well or other cavity 848, and one or more dispenser outlets in the form of roller assemblies 820. Each roller assembly 820 includes a roller ball 822 that is retained within a seal 824 via a removable retainer ring 828. Removal of the ring 828 (not shown) exposes the interior well 848. In at least some embodiments, the seal 824 is a flexible membrane that receives and holds the retainer ring 828 in place via pressure and friction.

With the roller ball 822 and retainer ring 828 removed from its seal 824, the interior well 848 may be filled with medicine 14 to a desired capacity. One or more fill lines 836 may be provided to aid in measuring out a desired dosage of the medicine 14. The roller ball 822 and retainer ring 828 may then be replaced in the seal 824. Thereafter, medicine 14 begins to coat the roller balls 822 from the inside. As the roller balls 822 roll around within their retainer rings 828, the coated portions rotate to the outside of the ball structure 850 where the medicine 14 can be delivered to a pet in at least some conditions. In particular, when the filled or partially-filled pet medicine dispenser 810 is provided to a pet 12, and the pet begins using its mouth to play with the toy 810, the medicine 14 tends to coat the roller balls 822 where it distributed into the pet's mouth.

Figure 13:
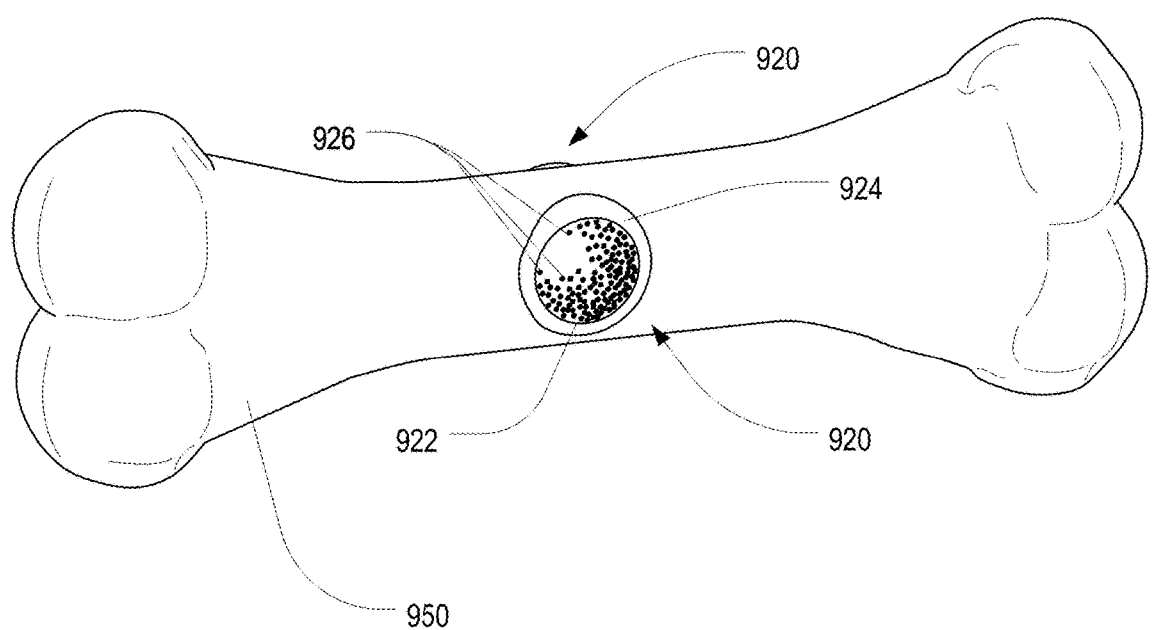
FIG. 13 is a perspective view of a "bone ball" pet toy for dispensing medicine in accordance with one or more preferred embodiments of the present invention.

FIG. 13 is a perspective view of a "bone ball" pet toy 910 for dispensing medicine in accordance with one or more preferred embodiments of the present invention. As shown therein, the pet toy dispenser may, in some embodiments, take on a shape other than that of a ball. As shown therein, this pet medicine dispenser 910 includes a bone-shaped support structure 950 and one or more dispenser outlets in the form of pad assemblies 920 disposed on, or embedded in, the surface of the bone-shaped support structure 950. In some embodiments, the support structure 950 may be solid, while in other the support structure 950 may be hollow. Each pad assembly 920 includes a medicine distribution pad 922, preferably having a textured surface 926 and absorbent qualities, that is retained on or in the surface of the bone-shaped support structure 950 via a retention seal 924. Liquid medicine 14 may be topically applied to the pad 922 and at least partially absorbed thereby. When the pet medicine dispenser 910 is then provided to a pet 12, and the pet begins using its mouth to play with the toy 910, the medicine 14 tends to leak or be squeezed out of the pads 922 and into the pet's mouth.

Figure 14A:
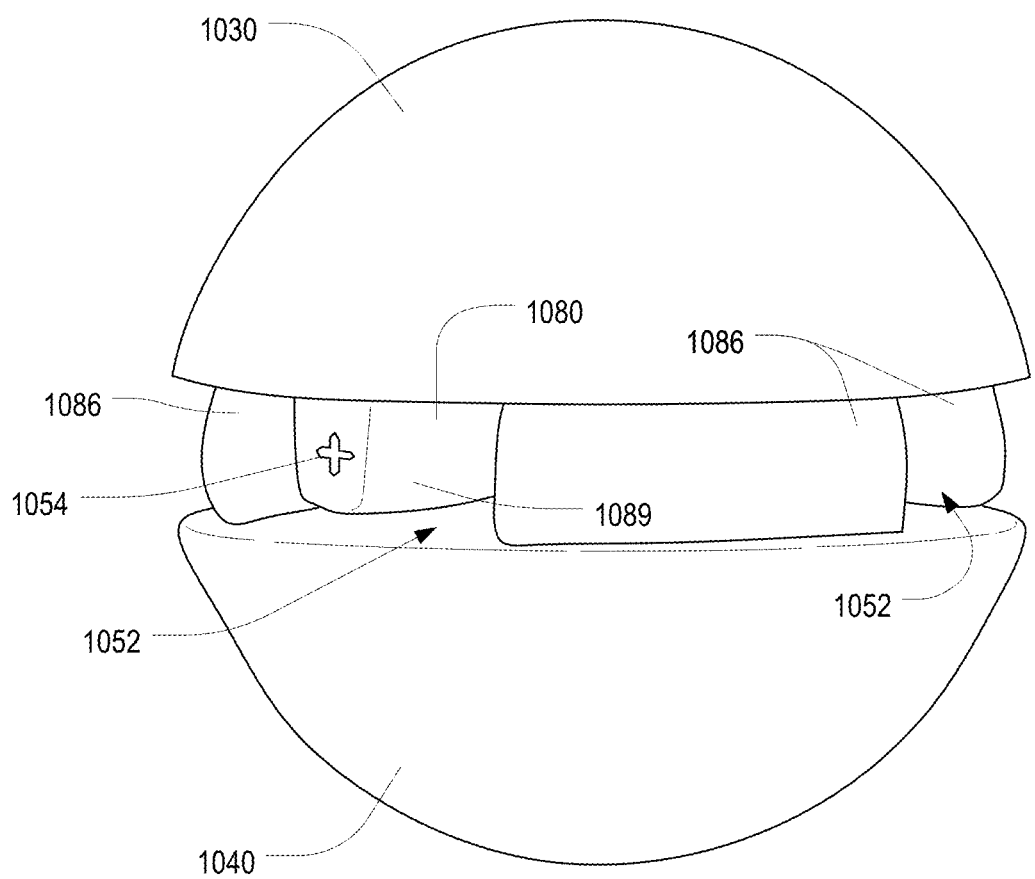
FIG. 14A is a perspective view of a "doughnut ball" pet toy for dispensing medicine in accordance with one or more preferred embodiments of the present invention.
Figure 14B:
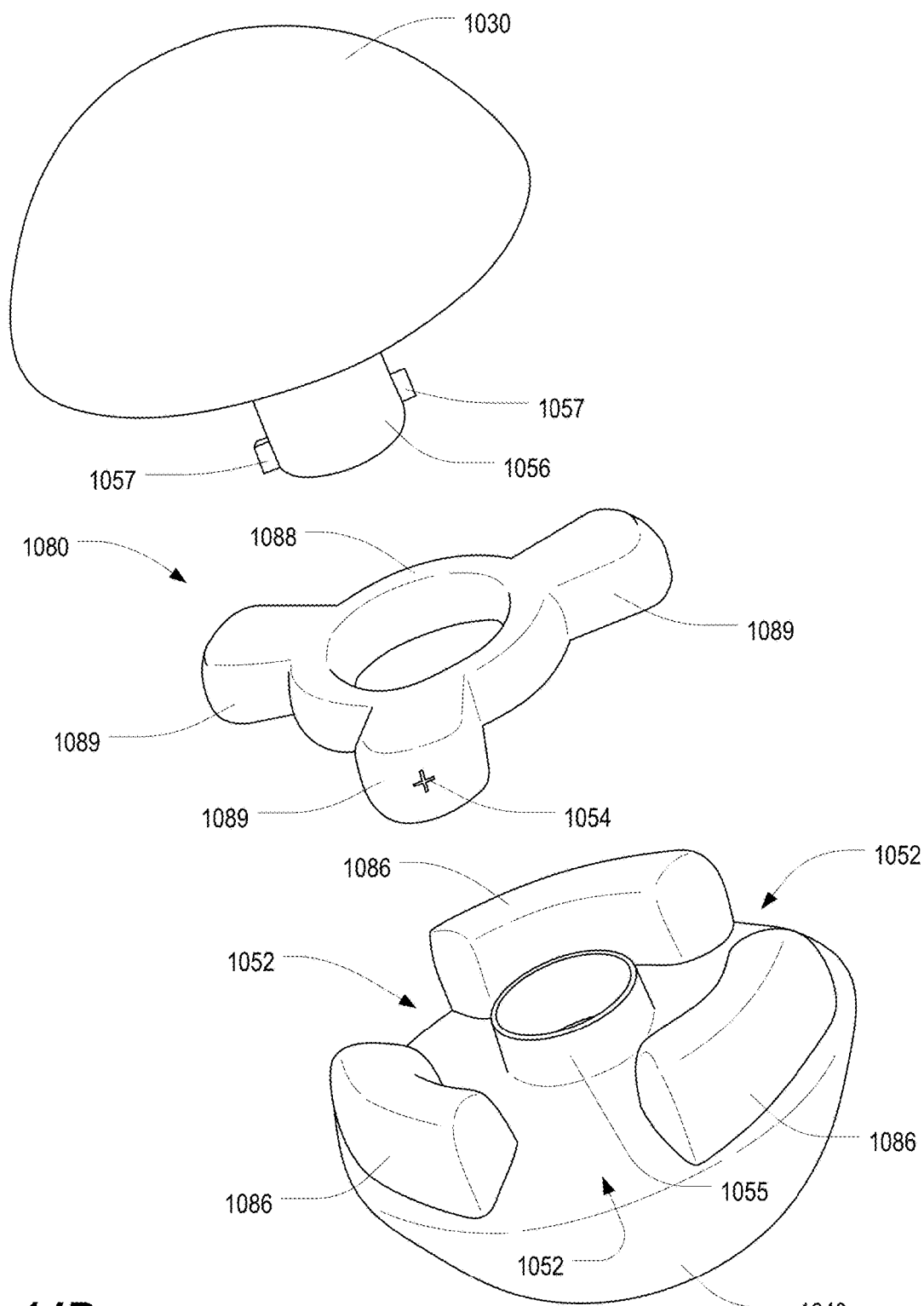
FIG. 14B is an exploded perspective view of the pet medicine dispenser of FIG. 14A.

FIG. 14A is a perspective view of a "doughnut ball" pet toy 1010 for dispensing medicine in accordance with one or more preferred embodiments of the present invention, and FIG. 14B is an exploded perspective view of the pet medicine dispenser 1010 of FIG. 14A. As shown therein, the pet medicine dispenser 1010 includes a two-piece exterior shell 1030,1040 and an interior bladder 1080. The lower shell half 1040 includes a central receptacle 1055 and plurality of raised portions 1086 with gaps 1052 defined therebetween. The upper shell half 1030 includes an axial post or core stem 1056 that extends downward from the center thereof. A plurality of radial lock tabs 1057 extend outward from the lower end of the axial post 1056. The two shell halves 1030,1040 may be attached together by inserting the axial post 1056 of the upper shell half 1030 into the receptacle 1055 of the lower shell half 1040 and locking it in place via the lock tabs 1057. One or both shell halves 1030,1040 may be made of rubber. Furthermore, in at least some embodiments, one or both shell halves 1030,1040 may be partially or completely made of transparent or translucent material. In the illustrated embodiment, the shell halves 1030,1040 together form a ball shape that is approximately spherical, but other shapes, such as other ball shapes, may alternatively be utilized. Furthermore, although the illustrated dispenser has two equal-sized half sections, the dispenser 1010 may alternatively be made of two sections of non-equal size.

The bladder 1080 includes a central ring 1088 or "doughnut" from which a plurality of spokes 1089 extend radially therefrom. In at least some embodiments, the bladder 1080 has both thermoplastic and elastomeric properties, and is preferably made of a thermoplastic elastomer (TPE) having a hardness of 0.50 durometers, giving it a "squishy" feel. Furthermore, in at least some embodiments, the bladder 1080 may be partially or completely made of transparent or translucent material. The central ring 1088 fits around the receptacle 1055, and the locations of the spokes 1089 correspond to the locations of the gaps 1052 between the raised portions 1086. The bladder 1080 defines an interior well or other cavity. With the lower shell half 1040 separated from the upper half 1030, the bladder 1080 may be filled with medicine 14 to a desired capacity. A plurality of dispenser outlets in the form of micro holes 1054 are disposed in the bladder 1080, such as in the ends of the spokes 1089, such that the liquid medicine 14 may leak out from the interior well under at least some conditions. In particular, when the pet medicine dispenser 1010 is at least partially filled with liquid medicine 14 and then provided to a pet 12, and the pet begins using its mouth to play with the toy 1010, the medicine 14 tends to leak through the micro holes 1054, out through the gaps 1052 between the raised portions 1086, and into the pet's mouth.

Figure 15A:
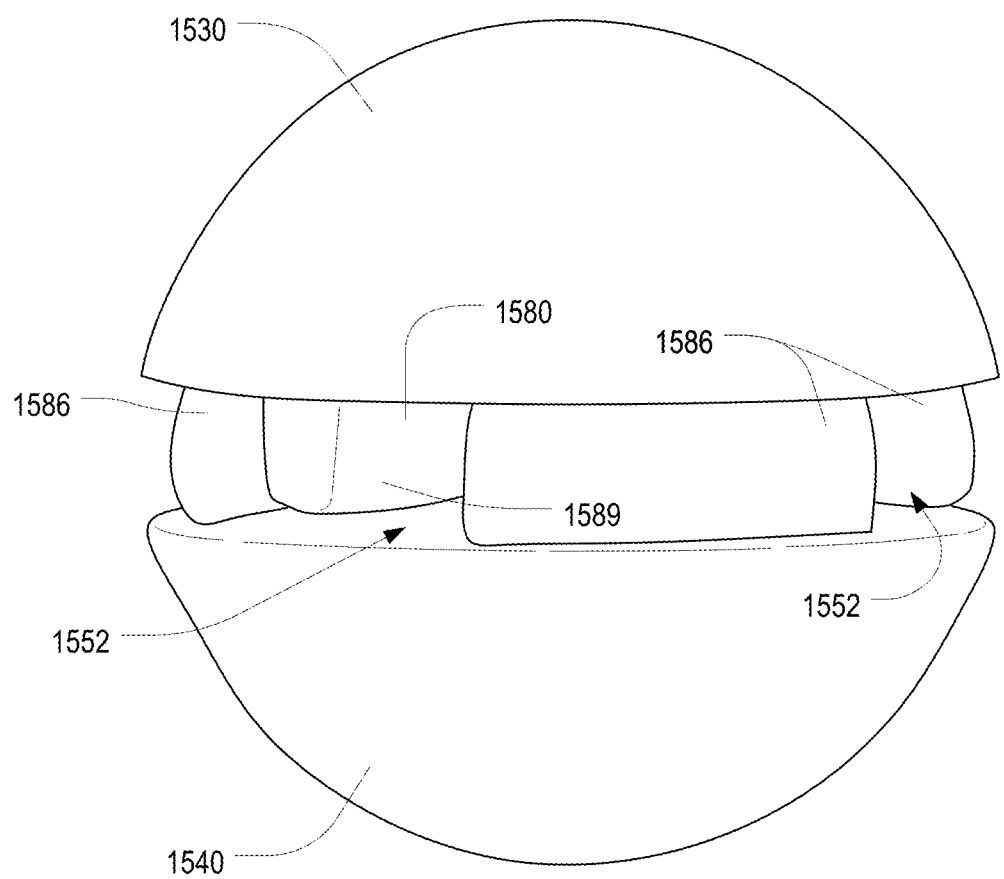
FIG. 15A is a perspective view of another "doughnut ball" pet toy for dispensing medicine in accordance with one or more preferred embodiments of the present invention.
Figure 15B:
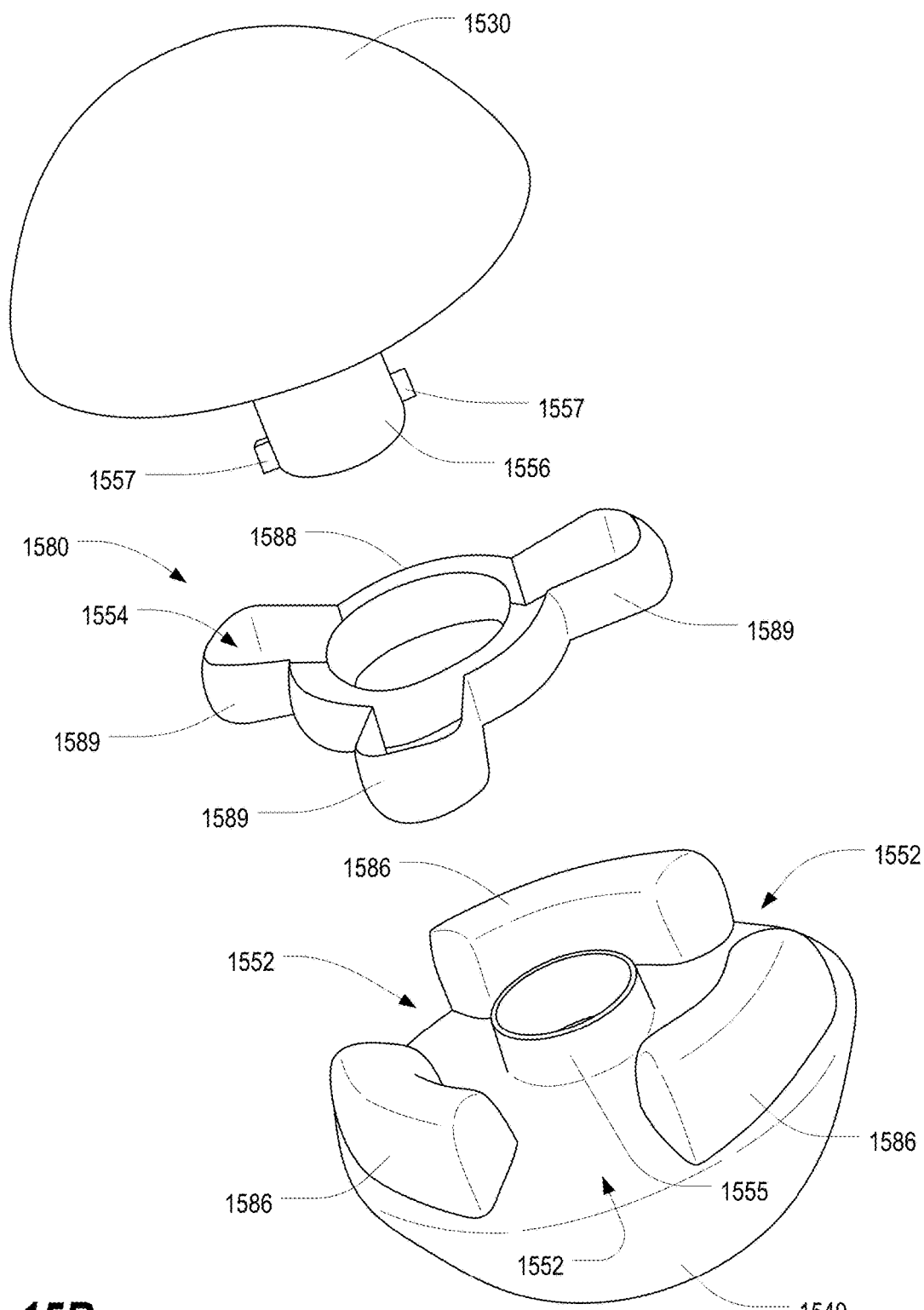
FIG. 15B is an exploded perspective view of the pet medicine dispenser of FIG. 15A.

FIG. 15A is a perspective view of another "doughnut ball" pet toy 1510 for dispensing medicine in accordance with one or more preferred embodiments of the present invention, and FIG. 15B is an exploded perspective view of the pet medicine dispenser 1510 of FIG. 15A. In many ways, this "doughnut ball" pet toy 1510 is similar to the pet toy 1010 of FIGS. 14A and 14B. The pet medicine dispenser 1510 of FIGS. 15A and 15B includes a two-piece exterior shell 1530,1540 and an interior bladder 1580. The lower shell half 1540 includes a central receptacle 1555 and plurality of raised portions 1586 with gaps 1552 defined therebetween. The upper shell half 1530 includes an axial post or core stem 1556 that extends downward from the center thereof. A plurality of radial lock tabs 1557 extend outward from the lower end of the axial post 1556. The two shell halves 1530,1540 may be attached together by inserting the axial post 1556 of the upper shell half 1530 into the receptacle 1555 of the lower shell half 1540 and locking it in place via the lock tabs 1557. One or both shell halves 1530,1540 may be made of rubber. Furthermore, in at least some embodiments, one or both shell halves 1530,1540 may be partially or completely made of transparent or translucent material. In the illustrated embodiment, the shell halves 1530,1540 together form a ball shape that is approximately spherical, but other shapes, such as other ball shapes, may alternatively be utilized. Furthermore, although the illustrated dispenser has two equal-sized half sections, the dispenser 1510 may alternatively be made of two sections of non-equal size.

The bladder 1580 includes a central ring 1588 or "doughnut" from which a plurality of spokes 1589 extend radially therefrom. In at least some embodiments, the bladder 1580 has both thermoplastic and elastomeric properties, and is preferably made of a thermoplastic elastomer (TPE) having a hardness of 0.50 durometers, giving it a "squishy" feel. Furthermore, in at least some embodiments, the bladder 1580 may be partially or completely made of transparent or translucent material. The central ring 1588 fits around the receptacle 1555, and the locations of the spokes 1589 correspond to the locations of the gaps 1552 between the raised portions 1586. The bladder 1580 is tray-shaped, defining an interior cavity 1554 with an open top. With the lower shell half 1540 separated from the upper half 1530, the bladder 1580 may be filled with medicine 14 to a desired capacity. When the upper half 1530 is then reinstalled on the lower shell half 1540, it acts as a cap or lid to the tray, temporarily sealing the upper half 1530 to the top of the bladder 1580. When the pet medicine dispenser 1510 is at least partially filled with liquid medicine 14 and then provided to a pet 12, and the pet begins using its mouth to play with the toy 1510, the medicine 14 tends to leak through the seal between the top of the bladder 1580 and the upper shell half 1530, out through the gaps 1552 between the raised portions 1586, and into the pet's mouth. Alternatively or additional, A plurality of dispenser outlets in the form of micro holes like the micro holes 1054 shown in FIGS. 14A and 14B may be disposed in the bladder 1580, such as in the ends of the spokes 1589, such that the liquid medicine 14 may leak out from the interior cavity under at least some conditions.

Figure 16:
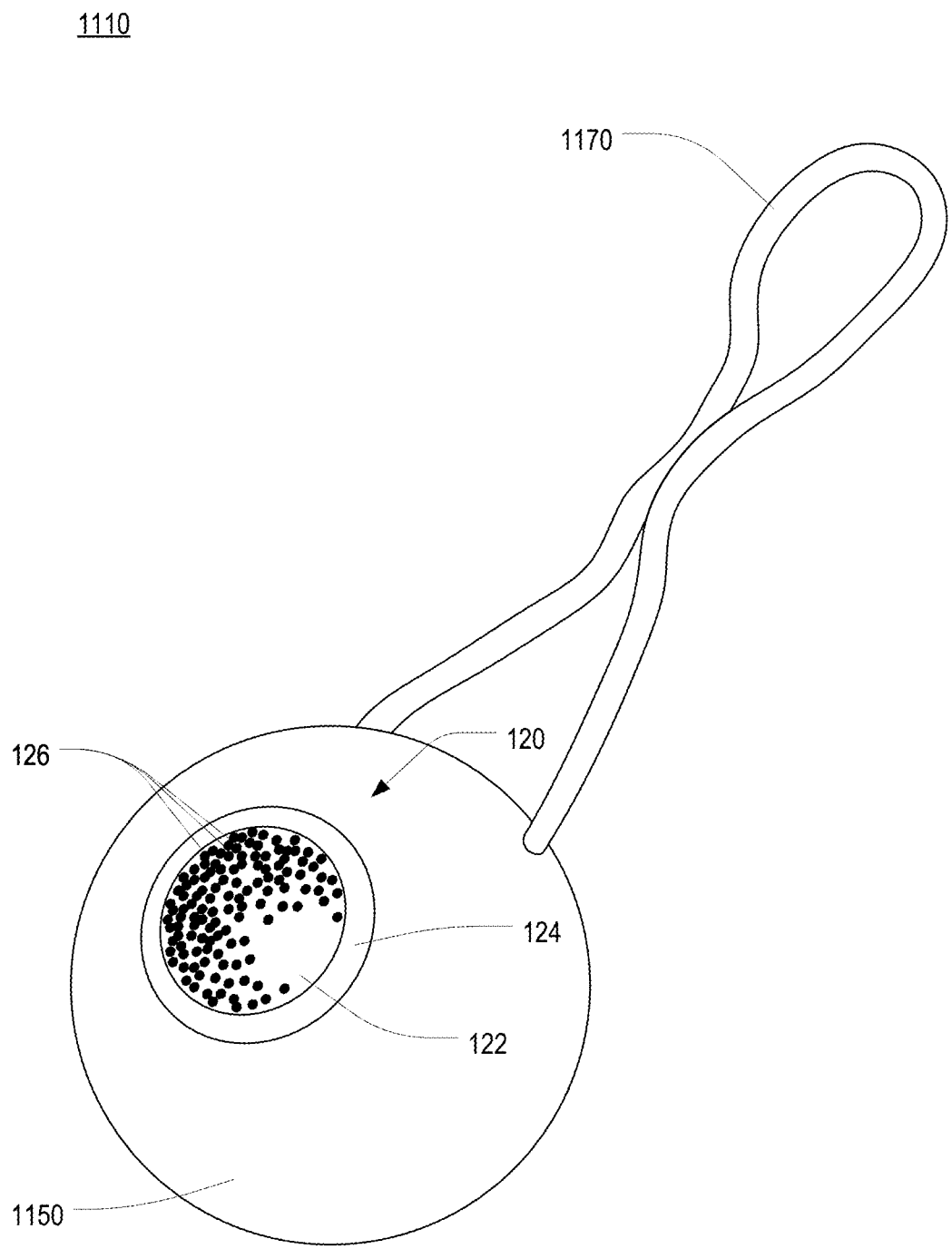
FIG. 16 is a perspective view of a "tug ball" pet toy for dispensing medicine in accordance with one or more preferred embodiments of the present invention.

FIG. 16 is a perspective view of a "tug ball" pet toy 1110 for dispensing medicine in accordance with one or more preferred embodiments of the present invention. As shown therein, this pet medicine dispenser 1110 is similar to the pet medicine dispenser 110 of FIG. 5 in that it includes a ball structure 1150 and one or more dispenser outlets in the form of pad assemblies 120 disposed on, or embedded in, the surface of the support structure 1150. In addition, however, the pet medicine dispenser 1110 of FIG. 16 further includes a rope, cord, or other handle 1170 attached to the ball structure 1150. The handle 1170 may be attached at each of its ends to the ball structure 1150, as shown, or it may be attached at only one end (not shown). When embodied as a rope, cord, or the like, the handle 1170 may be attached by inserting an end through a small aperture and knotting the end to prevent it from being withdrawn, but other attachment means may alternatively or additionally be utilized. Further, such a handle 1170 may be added to a ball having any number of other form factors, including those described and illustrated herein. The handle 1170 may be utilized by a human or another animal to engage in play with a pet 12, wherein the pet 12 may grasp the ball- or other-shaped housing in its teeth, between its paws, or the like, while the human or other animal holds the handle 1170, or vice versa.

In some embodiments, the ball structure 1150 may be solid, while in other the ball structure 1150 may be hollow. Each pad assembly 120 includes a medicine distribution pad 122, preferably having a textured surface 126 and absorbent qualities, that is retained on or in the surface of the ball structure 1150 via a retention seal 124. Liquid medicine 14 may be topically applied to the pad 122 and at least partially absorbed thereby. When the pet medicine dispenser 1110 is then provided to a pet 12, and the pet begins using its mouth to play with the toy 1110, the medicine 14 tends to leak or be squeezed out of the pads 122 and into the pet's mouth.

Figure 17A:
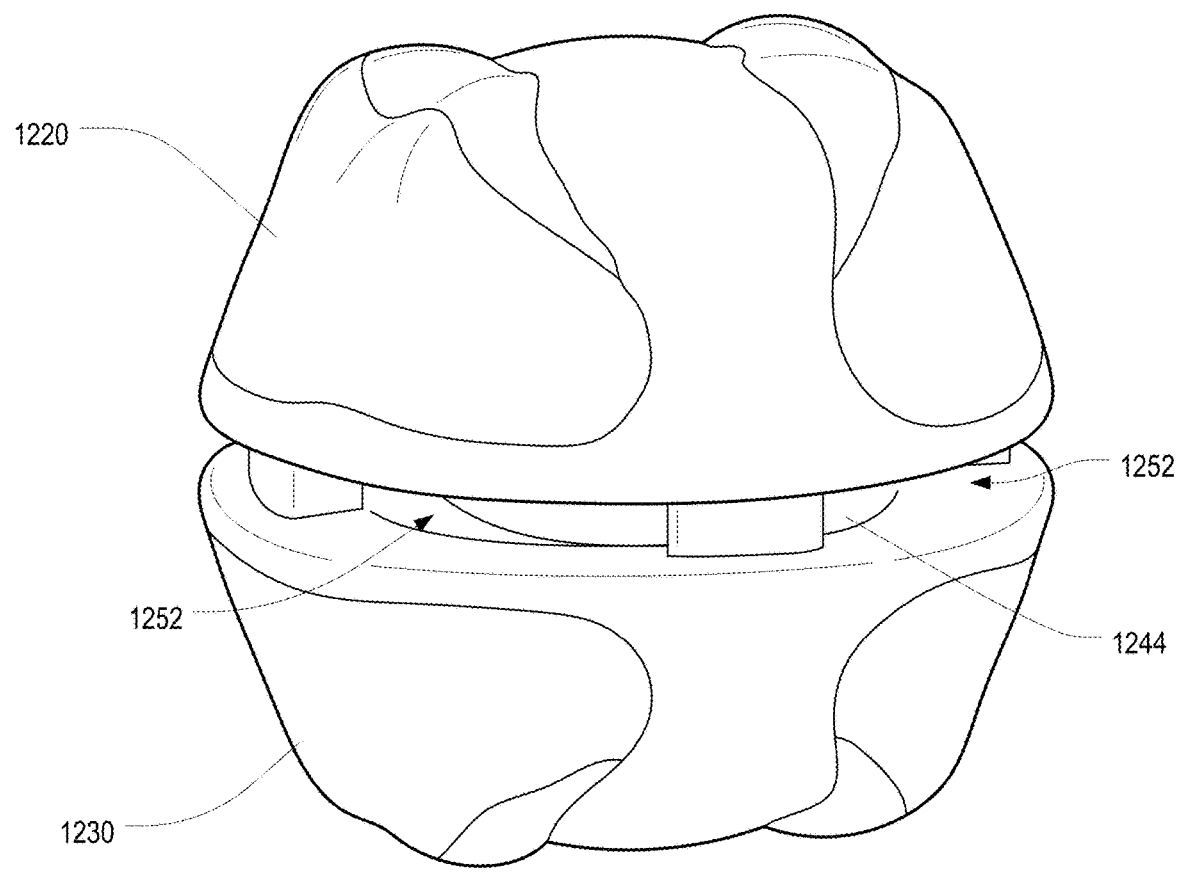
FIG. 17A is a perspective view of a "half paste ball" pet toy for dispensing medicine in accordance with one or more preferred embodiments of the present invention.
Figure 17B:
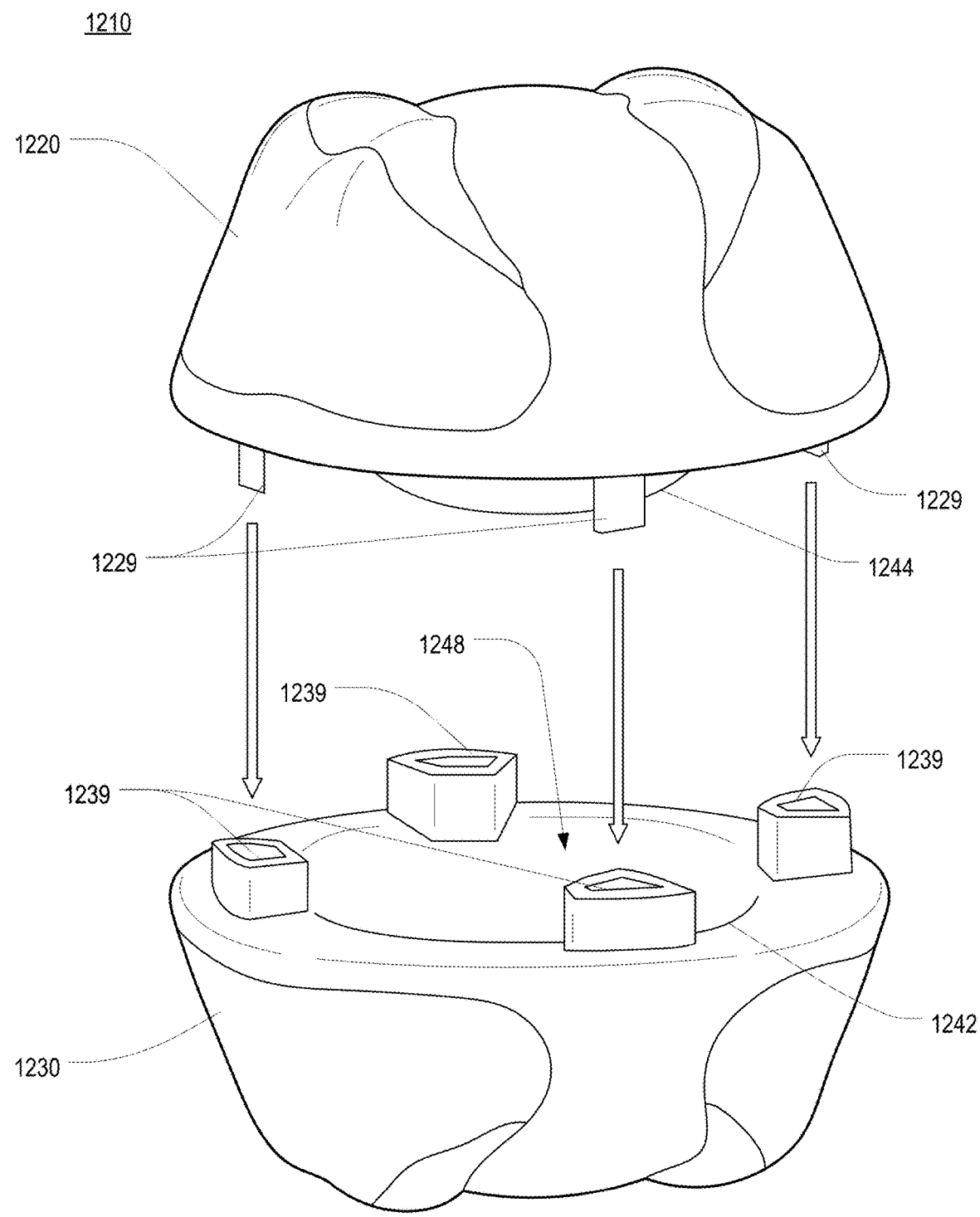
FIG. 17B is a perspective view of the pet medicine dispenser of FIG. 17A, shown with the two halves separated from one another.

FIG. 17A is a perspective view of a "half paste ball" pet toy 1210 for dispensing medicine in accordance with one or more preferred embodiments of the present invention, and FIG. 17B is a perspective view of the pet medicine dispenser 1210 of FIG. 17A, shown in an open state. As shown therein, the pet medicine dispenser 1210 includes a ball structure or shell, formed from two halves 1220,1230, which may be connected using locking peg and slot structures 1229,1239. With particular reference to FIG. 17B, the locking pegs 1229 fit into the locking slots 1239. When the ball halves 1220, 1230 are coupled together using the locking peg and slot structures 1229,1239, openings 1252 exist around the middle of the medicine dispenser 1210. The ball halves 1220,1230 may be made of rubber having a hardness, for example, of 0.85 durometers. In at least some embodiments, one or both ball halves 1220,1230 may be partially or completely made of transparent or translucent material.

The upper half 1220 also includes a pestle 1244 and the lower half 1230 includes a corresponding mortar 1242, defining an interior well or other cavity 1248. The mortar 1242 and pestle 1244 are aligned with each other and are sized such that the pestle 1244 may fit into the well 1248 of the mortar 1242 when moved together as described below. Exterior surfaces of the lower end of the pestle 1244 may be covered by protuberances, like those shown in FIGS. 1A-1G, or other surface features for at least a similar purpose.

Figure 17C:
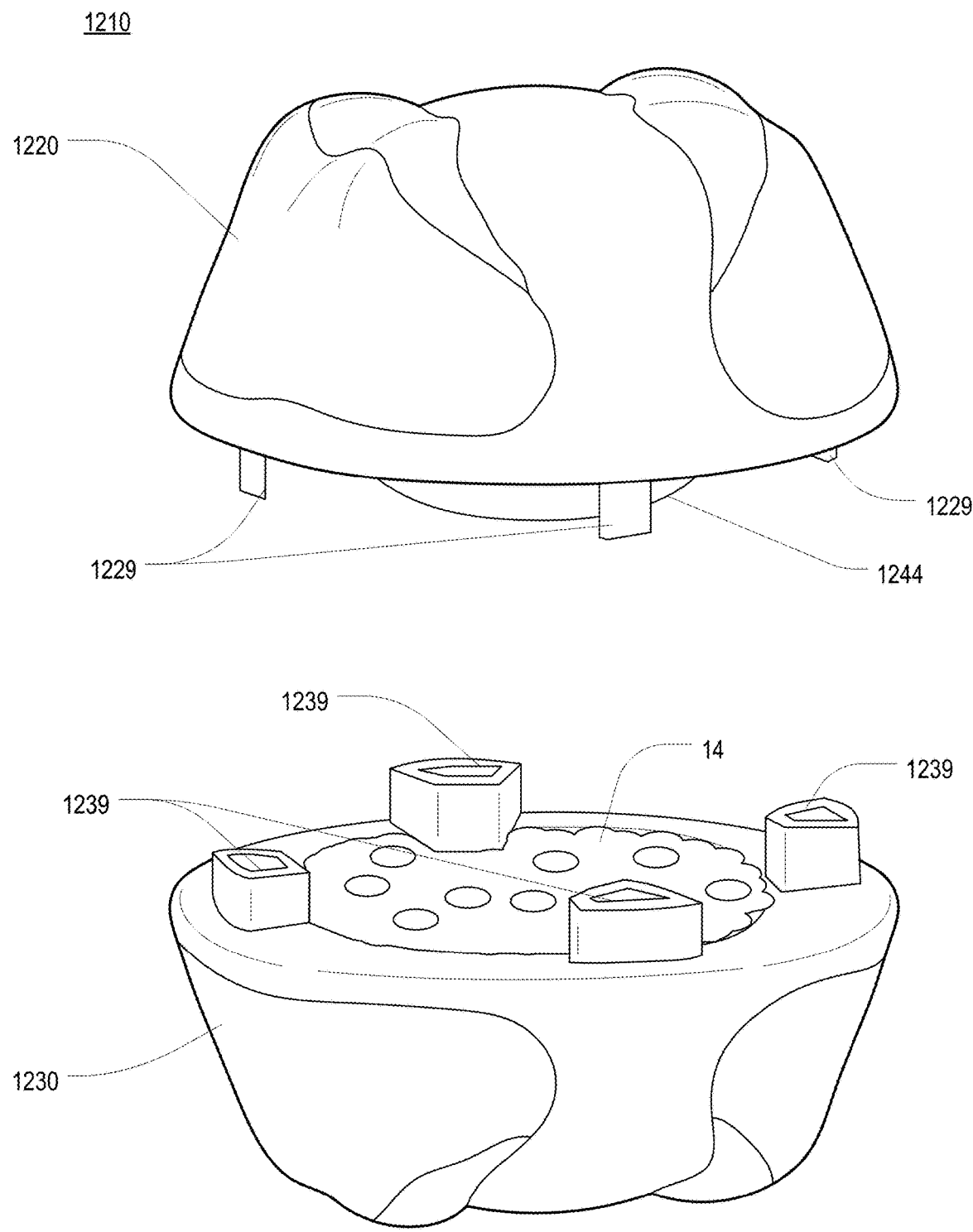
FIG. 17C is a perspective view of the pet medicine dispenser of FIG. 17B, shown with the lower half filled with paste.

FIG. 17C is a perspective view of the pet medicine dispenser 1210 of FIG. 17B, shown with the lower half 1230 filled with pet medicine in the form of a paste. With the lower half 1230 separated from the upper half 1220, the interior well 1248 of the mortar 1242 may be filled with medicine 14 to a desired capacity. Fill lines (not shown) may be provided to aid in measuring out a desired dosage of the medicine 14.

Figure 17D:
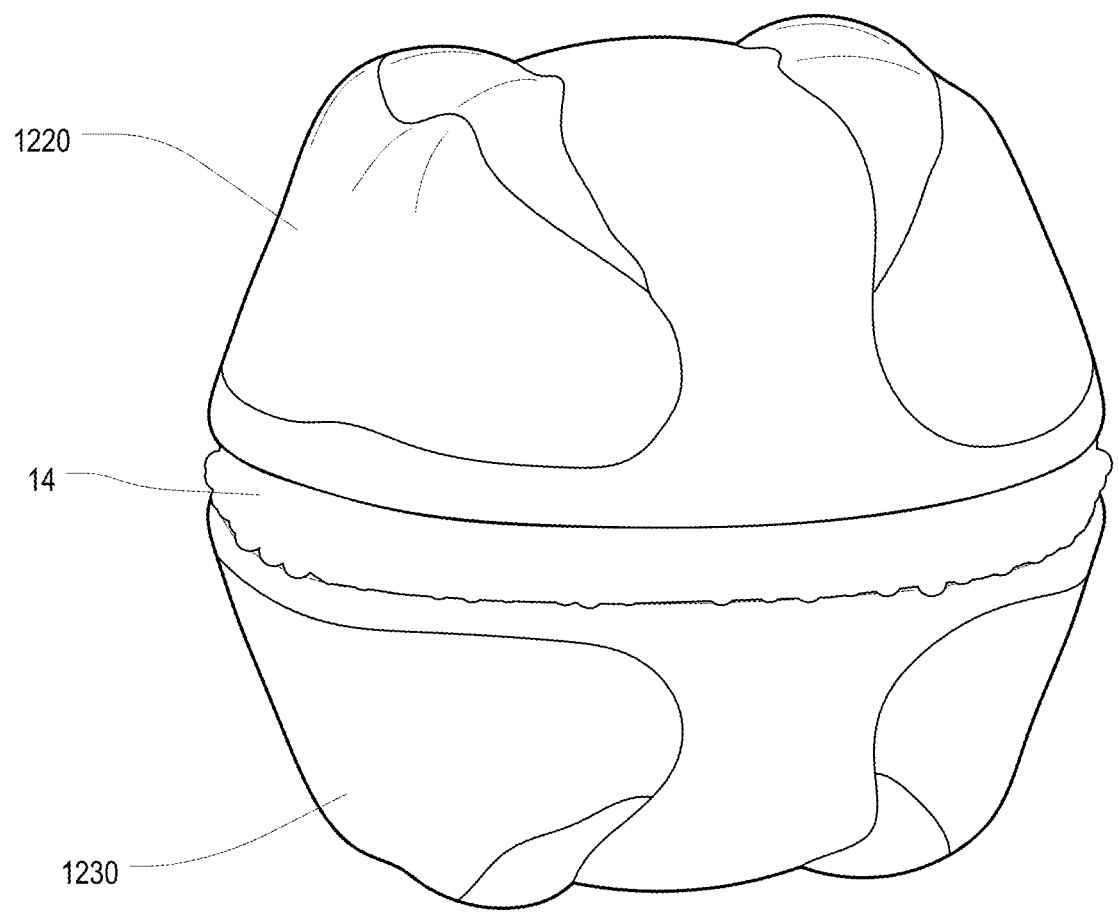
FIG. 17D is a perspective view of the pet medicine dispenser of FIG. 17C, shown with the two halves assembled back together.

FIG. 17D is a perspective view of the pet medicine dispenser 1210 of FIG. 17C, shown with the two halves 1220,1230 assembled back together. With the lower half 1230 recoupled to upper half 1220, the medicine 14 may begin to spill out of the mortar 1242 and out through the openings 1252 around the middle of the dispenser 1210. Particularly when the medicine 14 is in paste or semi-solid form, this process is particularly facilitated when the ball halves 1220,1230 are pushed together, thereby forcing the end of the pestle 1244 into the medicine 14 contained in the mortar 1242. Such action tends to cause the medicine 14 to spill out of the sides of the mortar 1242 and through the openings 1252. Additional dispersal of the medicine 14 occurs as the medicine 14 begins to stick to the pestle 1244 and any protuberances or other surface features thereon. As the pet medicine dispenser 1210 is manipulated, the medicine 14 is broken apart and alternately sticks to the pestle 1244 and falls off and out through the openings 1252. In at least some instances, the pet 12 may further assist in the process using its tongue by extending its tongue through the openings 1252 to reach the mortar 1242, pestle 1244, and the medicine 14 itself. In short, when the well 1248 of the mortar 1242 is filled with medicine 14, and the dispenser 1210 is then provided to a pet 12, the pet begins using its mouth to play with the toy 1210, the medicine 14 tends to spill out of the mortar 1242 through a variety of means and subsequently disperses out through the ball openings 1252 and into the pet's mouth.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A pet toy for dispensing medicine, comprising:
   an outer shell;
   an actuator assembly coupled to the outer shell;
   a mortar and pestle, wherein either the mortar or the pestle is supported by the actuator assembly; and
   an ingestible material initially disposed within the outer shell, wherein the ingestible material is initially disposed in the mortar;
   wherein manipulation, by a pet, of the actuator assembly relative to the outer shell causes the pestle to enter the mortar, thereby displacing the ingestible material from the mortar such that it exits the outer shell for ingestion by the pet.

2. The pet medicine dispenser of claim 1, wherein the pestle includes a plurality of protuberances.

3. The pet medicine dispenser of claim 1, wherein the pestle includes a plurality of surface features for assistance in breaking apart the ingestible material in the form of a paste or semi-solid and to which the ingestible material temporarily adheres to when the pestle enters the mortar.

4. The pet medicine dispenser of claim 1, wherein the outer shell includes a plurality of windows, and wherein the ingestible material exits the outer shell through the windows when the actuator assembly is manipulated by the pet.

5. The pet medicine dispenser of claim 4, wherein each of the windows is large enough to permit the ingestible material to be loaded therein.

6. The pet medicine dispenser of claim 1, wherein the actuator assembly includes an actuator and a resilient skirt, baffle or other structure connecting the actuator to the outer shell.

7. The pet medicine dispenser of claim 6, wherein the actuator is a button-type actuator.

8. The pet medicine dispenser of claim 1, wherein the actuator assembly and outer shell include fittings that mate with one another to permit the actuator assembly to be removed from the outer shell.

9. The pet medicine dispenser of claim 8, wherein the fittings are threaded fittings.

10. The pet medicine dispenser of claim 1, wherein at least one dosage line is disposed in a cavity.

11. The pet medicine dispenser of claim 10, wherein the dosage line is disposed so as to correspond to a precise dosage measurement, and is marked with the dosage measurement.

12. The pet medicine dispenser of claim 10, wherein a plurality of dosage lines, of different precise dosage measurements, are disposed in the cavity.

13. The pet toy of claim 1, wherein the mortar is bowl-shaped and the pestle is a blunt tool whose distal end fits into the bowl-shaped mortar.

14. The pet medicine dispenser of claim 1, wherein the outer shell includes an upper portion and a lower portion, and wherein the upper portion and lower portion are separable so as to permit the ingestible material to be loaded therein.

15. A pet toy for dispensing medicine, comprising:
an outer shell, including at least an upper portion and a lower portion resiliently coupled together such that when they are pushed closer together they are biased to spring back apart; and
an interior cavity in which an ingestible material is initially disposed;
wherein manipulation, by a pet, of the upper portion relative to the lower portion causes the ingestible material to exit the interior cavity and the outer shell for ingestion by the pet.

16. A pet toy for dispensing medicine, comprising:
an outer shell, including at least an upper portion and a lower portion resiliently coupled together such that when they are pushed closer together they are biased to spring back apart; and
an mortar and pestle, wherein an ingestible material is initially disposed in the mortar;
wherein manipulation, by a pet, of the upper portion relative to the lower portion causes the pestle to enter the mortar, thereby displacing the ingestible material from the mortar such that it exits the outer shell for ingestion by the pet.

17. The pet medicine dispenser of claim 16, wherein the pestle includes a plurality of protuberances.

18. The pet medicine dispenser of claim 16, wherein the pestle includes a plurality of surface features for assistance in breaking apart ingestible material in the form of a paste or semi-solid and to which the ingestible material temporarily adheres to when the pestle enters the mortar.

19. The pet medicine dispenser of claim 16, wherein the outer shell includes a plurality of windows, and wherein the ingestible material exits the outer shell through the windows when the actuator assembly is manipulated by the pet.

* * * * *